(12) United States Patent
Proost et al.

(10) Patent No.: US 12,318,724 B2
(45) Date of Patent: Jun. 3, 2025

(54) FILTER ELEMENT WITH SEAL RECEIVER

(71) Applicant: Donaldson Company, Inc., Bloomington, MN (US)

(72) Inventors: Gert Proost, Kessel-lo (BE); Kristof Decoster, Vilvoorde (BE); Bart Catoor, Kessel-lo (BE); Mathijs Verstraete, Tienen (BE); Anthonius Jan-Baptist Maria Moers, Holsbeek (BE)

(73) Assignee: Donaldson Company, Inc., Bloomington, MN (US)

( * ) Notice: Subject to any disclaimer, the term of this patent is extended or adjusted under 35 U.S.C. 154(b) by 225 days.

(21) Appl. No.: 17/912,819

(22) PCT Filed: Mar. 19, 2021

(86) PCT No.: PCT/US2021/023264
§ 371 (c)(1),
(2) Date: Sep. 19, 2022

(87) PCT Pub. No.: WO2021/188967
PCT Pub. Date: Sep. 23, 2021

(65) Prior Publication Data
US 2023/0356130 A1 Nov. 9, 2023

(30) Foreign Application Priority Data
Mar. 19, 2020 (EP) .................................... 20164153

(51) Int. Cl.
*B01D 46/24* (2006.01)
*B01D 46/52* (2006.01)

(52) U.S. Cl.
CPC ....... *B01D 46/2403* (2013.01); *B01D 46/527* (2013.01); *B01D 2265/028* (2013.01); *B01D 2271/027* (2013.01); *B01D 2275/206* (2013.01)

(58) Field of Classification Search
CPC .... B01D 46/525–527; B01D 2265/026; B01D 2265/028; B01D 2275/206;
(Continued)

(56) References Cited

U.S. PATENT DOCUMENTS

| 3,025,963 A | 3/1962 | Bauer |
| 4,925,561 A | 5/1990 | Ishii et al. |

(Continued)

FOREIGN PATENT DOCUMENTS

| CN | 1898005 | 1/2007 |
| CN | 1325141 | 7/2007 |

(Continued)

OTHER PUBLICATIONS

International Search Report and Written Opinion for PCT/US2021/023264 (Jun. 11, 2021).

*Primary Examiner* — Robert Clemente
(74) *Attorney, Agent, or Firm* — Merchant & Gould P.C.

(57) ABSTRACT

A filter element for insertion into a housing of a filter system. The filter element includes a filter medium pack and a seal receiver. The filter medium pack has an outer circumferential face extending between a first outer axial face and a second outer axial face, opposite the first outer axial face. The filter element further includes a seal receiver sealingly attached to the filter medium pack. The seal receiver includes a closed-loop surface suitable for receiving a removable circumferential seal member, and wherein the closed-loop surface forms a contour shape with single-fold rotational symmetry. A seal assembly including a filter element and a seal carrier is also presented.

20 Claims, 18 Drawing Sheets

(58) Field of Classification Search
CPC .......... B01D 2271/02; B01D 2271/022; B01D 2271/025; B01D 2271/027; B01D 46/2403; B01D 46/2411; B01D 46/2414
See application file for complete search history.

(56) References Cited

U.S. PATENT DOCUMENTS

| | | |
|---|---|---|
| 5,049,326 A | 9/1991 | Matsumoto et al. |
| 5,472,463 A | 12/1995 | Herman et al. |
| 5,525,226 A | 6/1996 | Brown et al. |
| 5,562,825 A | 10/1996 | Yamada et al. |
| 5,613,992 A | 3/1997 | Engel |
| 5,738,785 A | 4/1998 | Brown et al. |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,039,778 A | 3/2000 | Coulonvaux |
| D428,128 S | 7/2000 | Gillingham et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,350,296 B1 | 2/2002 | Warner |
| 6,416,605 B1 | 7/2002 | Golden |
| 6,419,718 B1 | 7/2002 | Klug et al. |
| 6,482,247 B2 | 11/2002 | Jaroszczyk et al. |
| 6,517,598 B2 | 2/2003 | Anderson et al. |
| 6,638,332 B1 | 10/2003 | Schmitz et al. |
| 6,673,136 B2 | 1/2004 | Gillingham et al. |
| 6,936,084 B2 | 8/2005 | Schlensker et al. |
| 6,949,189 B2 | 9/2005 | Bassett et al. |
| 7,311,748 B2 | 12/2007 | Holmes et al. |
| 7,351,270 B2 | 4/2008 | Engelland et al. |
| 7,396,376 B2 | 7/2008 | Schrage et al. |
| 7,494,017 B2 | 2/2009 | Miller |
| 7,625,419 B2 | 12/2009 | Nelson et al. |
| 7,708,953 B2 | 5/2010 | Cremeens et al. |
| 7,967,886 B2 | 6/2011 | Schrage et al. |
| 8,034,145 B2 | 10/2011 | Boehrs et al. |
| 8,061,530 B2 | 11/2011 | Kindkeppel et al. |
| 8,097,061 B2 | 1/2012 | Smith et al. |
| 8,246,702 B2 | 8/2012 | Ackermann et al. |
| 8,349,049 B2 | 1/2013 | Amesöder et al. |
| 8,361,181 B2 | 1/2013 | Osendorf et al. |
| 8,409,316 B2 | 4/2013 | Nelson et al. |
| RE44,424 E | 8/2013 | Barnwell |
| 8,778,044 B2 | 7/2014 | Amesoeder et al. |
| 8,864,866 B2 | 10/2014 | Osendorf et al. |
| 8,916,044 B2 | 12/2014 | Rapin |
| 9,114,346 B2 | 8/2015 | Schrage et al. |
| 9,120,047 B2 | 9/2015 | Boehrs et al. |
| 9,162,172 B2 | 10/2015 | Nepsund et al. |
| 9,180,399 B2 | 11/2015 | Reichter et al. |
| 9,205,361 B2 | 12/2015 | Menssen et al. |
| 9,320,997 B2 | 4/2016 | Campbell et al. |
| 9,346,001 B2 | 5/2016 | Kato et al. |
| 9,346,002 B2 | 5/2016 | Kleynen |
| 10,029,198 B2 | 7/2018 | Adamek et al. |
| 10,357,732 B2 | 7/2019 | Rieger et al. |
| 10,835,852 B2 | 11/2020 | Decoster et al. |
| 11,426,691 B2 | 8/2022 | Decoster et al. |
| 11,517,840 B2 | 12/2022 | Moers et al. |
| 11,517,844 B2 | 12/2022 | Decoster et al. |
| 2003/0217534 A1* | 11/2003 | Krisko .................. B01D 50/20 55/482 |
| 2004/0187689 A1 | 9/2004 | Sporre et al. |
| 2005/0130508 A1 | 6/2005 | Yeh |
| 2005/0252182 A1 | 11/2005 | Golden et al. |
| 2006/0037296 A1 | 2/2006 | Duffy |
| 2006/0090434 A1 | 5/2006 | Brown et al. |
| 2007/0039296 A1* | 2/2007 | Schrage ............... B01D 29/012 55/497 |
| 2007/0175187 A1 | 8/2007 | Kopec et al. |
| 2007/0261662 A1* | 11/2007 | Lampert ................ B01D 46/10 55/428 |
| 2008/0016832 A1 | 1/2008 | Krisko et al. |
| 2008/0041026 A1 | 2/2008 | Engel et al. |
| 2008/0110142 A1 | 5/2008 | Nelson et al. |
| 2008/0142426 A1 | 6/2008 | Greco et al. |
| 2008/0196368 A1 | 8/2008 | Waibel |
| 2008/0282890 A1 | 11/2008 | Rocklitz et al. |
| 2009/0127211 A1 | 5/2009 | Rocklitz et al. |
| 2009/0230051 A1 | 9/2009 | Holmes et al. |
| 2009/0320424 A1 | 12/2009 | Merritt et al. |
| 2010/0032365 A1 | 2/2010 | Moe et al. |
| 2010/0064646 A1 | 3/2010 | Smith et al. |
| 2010/0115897 A1 | 5/2010 | Krisko et al. |
| 2010/0258493 A1 | 10/2010 | Kindkeppel et al. |
| 2011/0005397 A1 | 1/2011 | Dackam et al. |
| 2011/0197556 A1 | 8/2011 | Brown et al. |
| 2011/0226406 A1 | 9/2011 | Merritt et al. |
| 2012/0061307 A1 | 3/2012 | Kindkeppel et al. |
| 2012/0067014 A1 | 3/2012 | Dhiman et al. |
| 2012/0285902 A1 | 11/2012 | Holm et al. |
| 2012/0311983 A1 | 12/2012 | Swanson et al. |
| 2013/0000267 A1 | 1/2013 | Merritt |
| 2013/0062270 A1 | 3/2013 | Braunheim |
| 2013/0248090 A1 | 9/2013 | Moe et al. |
| 2014/0047808 A1 | 2/2014 | Menssen et al. |
| 2014/0102057 A1 | 4/2014 | Nepsund et al. |
| 2014/0102060 A1 | 4/2014 | Kato et al. |
| 2014/0165834 A1 | 6/2014 | Kaufmann et al. |
| 2014/0174047 A1 | 6/2014 | Croissant |
| 2014/0208705 A1 | 7/2014 | Krull |
| 2014/0251895 A1 | 9/2014 | Wagner |
| 2014/0260143 A1 | 9/2014 | Kaiser |
| 2015/0013289 A1 | 1/2015 | Hazenfrats et al. |
| 2015/0096931 A1 | 4/2015 | Jensen |
| 2015/0101295 A1 | 4/2015 | Thompson et al. |
| 2015/0101299 A1 | 4/2015 | Osendorf et al. |
| 2015/0306530 A1 | 10/2015 | Reichter et al. |
| 2015/0345438 A1 | 12/2015 | Finn et al. |
| 2016/0040633 A1 | 2/2016 | Schmid et al. |
| 2016/0045848 A1 | 2/2016 | Campbell et al. |
| 2016/0059172 A1 | 3/2016 | Allott et al. |
| 2016/0131094 A1 | 5/2016 | Pereira Madeira et al. |
| 2016/0214052 A1 | 7/2016 | Moser et al. |
| 2017/0001134 A1 | 1/2017 | Rieger et al. |
| 2017/0232374 A1 | 8/2017 | Osendorf et al. |
| 2017/0266601 A1 | 9/2017 | Carter et al. |
| 2018/0142650 A1 | 5/2018 | Finn |
| 2018/0318745 A1 | 11/2018 | Nichols et al. |
| 2018/0345196 A1 | 12/2018 | Campbell et al. |
| 2018/0369735 A1 | 12/2018 | Decoster et al. |
| 2019/0070548 A1 | 3/2019 | Franz et al. |
| 2019/0105593 A1 | 4/2019 | Krull et al. |
| 2019/0299143 A1 | 10/2019 | Decoster et al. |
| 2020/0047105 A1 | 2/2020 | Govardhan et al. |
| 2021/0101104 A1 | 4/2021 | Decoster et al. |
| 2022/0274041 A1* | 9/2022 | Manley ................ B01D 46/10 |
| 2023/0001341 A1 | 1/2023 | Decoster et al. |

FOREIGN PATENT DOCUMENTS

| | | |
|---|---|---|
| CN | 1993163 | 7/2007 |
| CN | 101405068 | 4/2009 |
| CN | 201253524 | 6/2009 |
| CN | 102264452 | 11/2011 |
| CN | 102302880 | 1/2012 |
| CN | 103391801 | 11/2013 |
| CN | 104815488 | 8/2015 |
| CN | 104955545 | 9/2015 |
| CN | 105964059 | 9/2016 |
| DE | 3622955 | 1/1988 |
| DE | 3806208 | 9/1989 |
| DE | 10309660 | 9/2004 |
| DE | 102008027847 | 12/2009 |
| DE | 202008017059 | 6/2010 |

(56) References Cited

FOREIGN PATENT DOCUMENTS

| | | | |
|---|---|---|---|
| DE | 102011011595 | 8/2012 | |
| DE | 102011111366 A1 * | 2/2013 | ......... B01D 46/0001 |
| DE | 102014016908 | 5/2015 | |
| DE | 102015016236 | 7/2016 | |
| DE | 102016002954 | 9/2016 | |
| EP | 1656982 | 5/2006 | |
| EP | 2140922 | 1/2010 | |
| EP | 2675547 | 12/2013 | |
| EP | 2774667 | 9/2014 | |
| EP | 2665535 | 4/2016 | |
| EP | 3311902 | 4/2018 | |
| EP | 3311902 A1 | 4/2018 | |
| EP | 3453443 | 3/2019 | |
| EP | 3453443 A1 | 3/2019 | |
| EP | 2723470 B2 | 10/2019 | |
| KR | 10-2011-0025652 | 3/2011 | |
| WO | 9740918 | 11/1997 | |
| WO | 9937386 | 7/1999 | |
| WO | 02098540 | 12/2002 | |
| WO | 03047722 | 6/2003 | |
| WO | 03095068 | 11/2003 | |
| WO | 2004/007054 | 1/2004 | |
| WO | 2004/082795 | 9/2004 | |
| WO | 2005063361 | 7/2005 | |
| WO | 2005/077487 | 8/2005 | |
| WO | 2006/014941 | 2/2006 | |
| WO | 2006/026241 | 3/2006 | |
| WO | 2006/076456 | 7/2006 | |
| WO | 2006/076479 | 7/2006 | |
| WO | 2007/133635 | 11/2007 | |
| WO | 2009/014988 | 1/2009 | |
| WO | 2009/039285 | 3/2009 | |
| WO | WO-2009033040 A1 * | 3/2009 | ......... B01D 46/0001 |
| WO | 2010/033291 | 3/2010 | |
| WO | 2010/117799 | 10/2010 | |
| WO | 2013/063497 | 5/2013 | |
| WO | 2013/104792 | 7/2013 | |
| WO | 2014/078796 | 5/2014 | |
| WO | 2014/210541 | 12/2014 | |
| WO | 2015/010085 | 1/2015 | |
| WO | 2015/054397 | 4/2015 | |
| WO | 2016/077377 | 5/2016 | |
| WO | 2016/105560 | 6/2016 | |
| WO | 2017/079191 | 5/2017 | |
| WO | 2017/106752 | 6/2017 | |
| WO | 2017144289 | 8/2017 | |
| WO | 2017/174199 A1 | 10/2017 | |
| WO | 2022226098 | 10/2022 | |

* cited by examiner

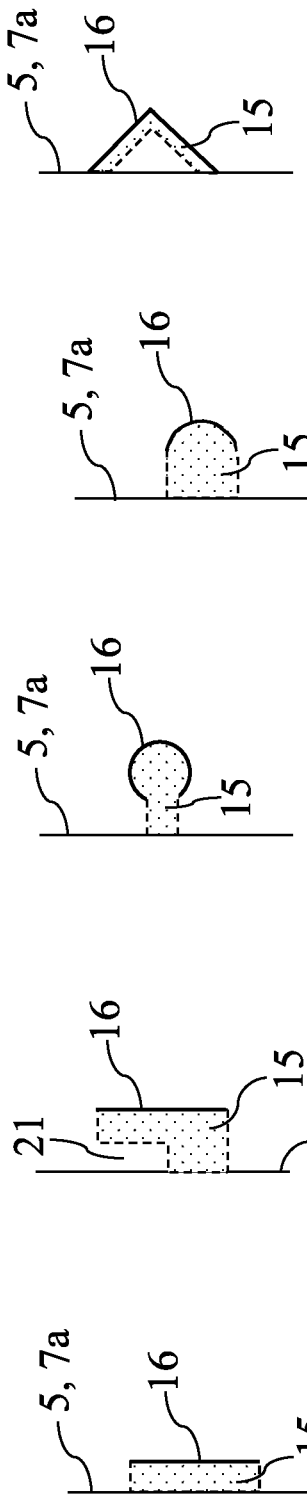
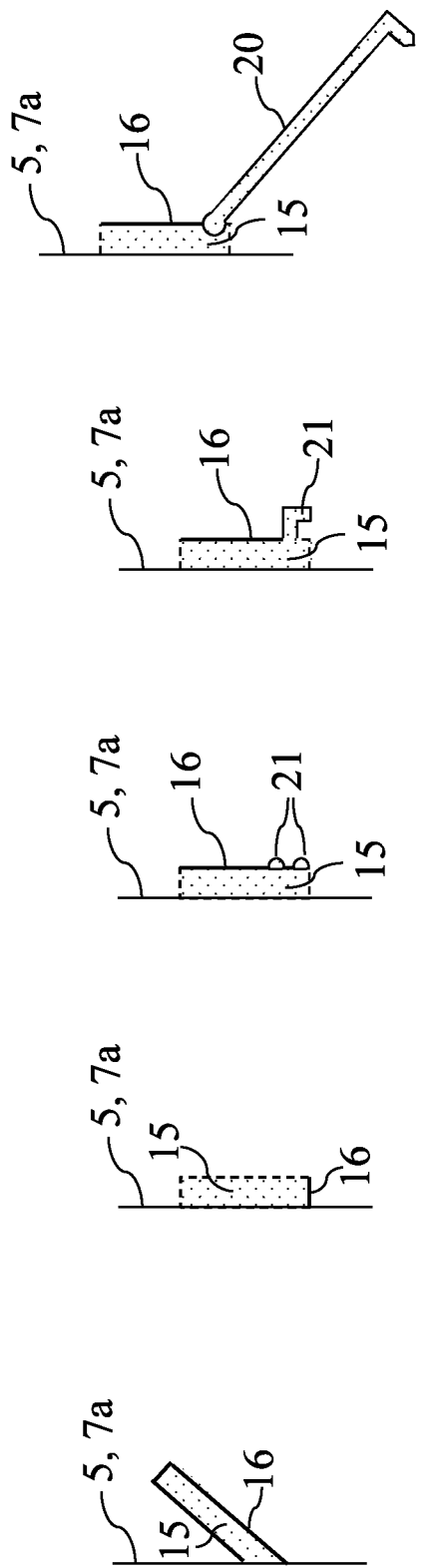

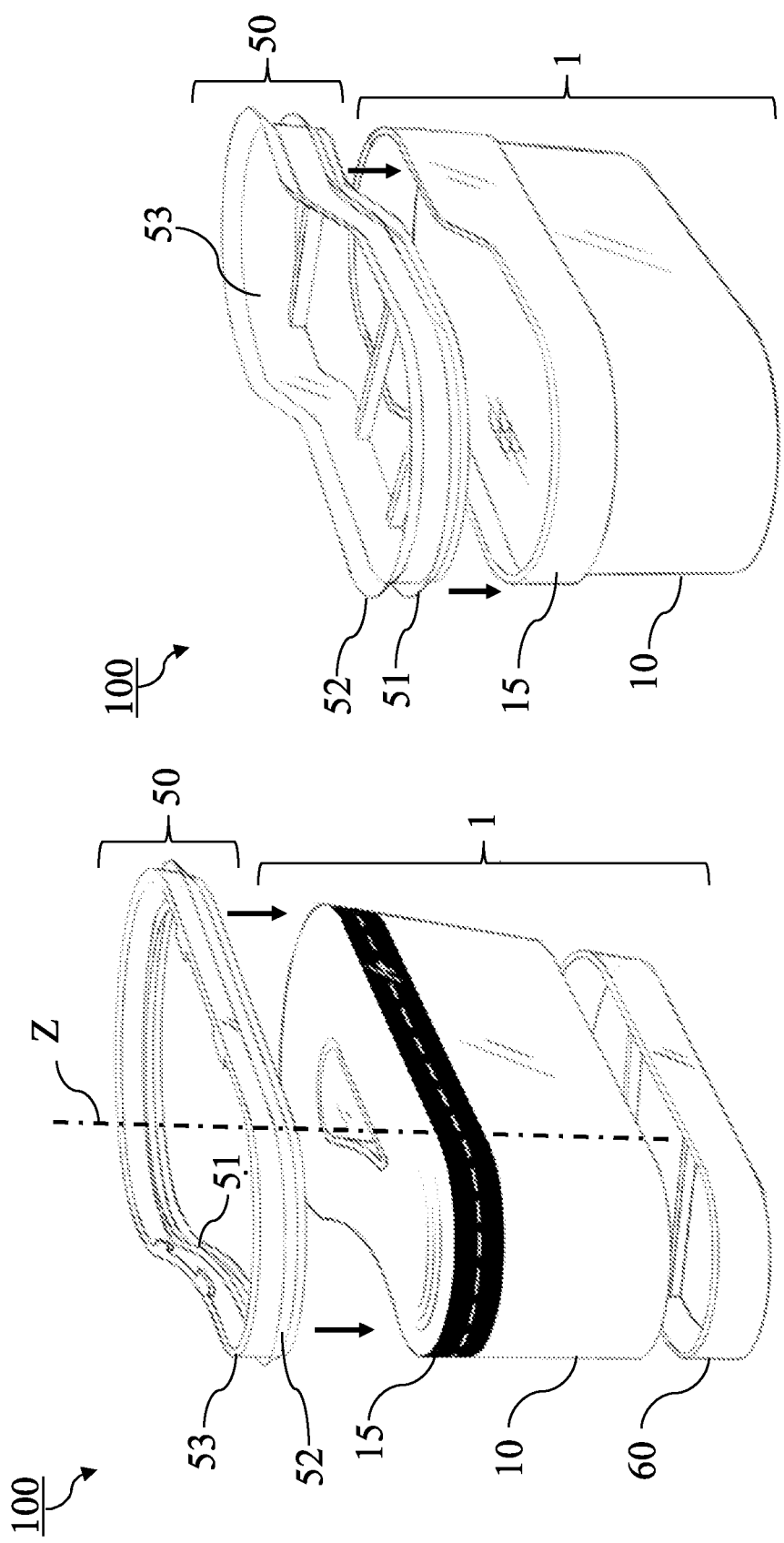

FILTER ELEMENT WITH SEAL RECEIVER

This application is a National Stage Application of PCT/US2021/023264, filed Mar. 19, 2021, which claims benefit of priority to European Patent Application No. 20164153.7, filed Mar. 19, 2020, and which applications are incorporated herein by reference. To the extent appropriate, a claim of priority is made to each of the above disclosed applications.

FIELD OF THE DISCLOSURE

The present disclosure relates to a filter element comprising a filter medium pack for filtering a fluid, more specifically a filter element that can be inserted into a housing of a filter system and can be removed for servicing.

BACKGROUND

Filter elements, also named filter cartridges, are used for a wide variety of filtering applications and the fluid to be filtered can be a liquid or a gas, e.g., air.

Indeed, in many instances, it is desired to filter contaminant material from a fluid stream. For example, airflow streams to engines for motorized vehicles or for power generation equipment, construction equipment or other equipment, gas streams to gas turbine systems and air streams to various combustion furnaces, carry particulate contaminant therein. It is preferred for such systems that contaminant materials be removed from the fluid or at least be reduced.

The filter element comprises a filter medium pack including filter media and these filter media remove contaminant materials when the fluid flows through the filter media. Commonly used and commercially available filter media are for example pleated media or fluted media.

Generally, the filter medium pack has a tubular shape and comprises an outer circumferential face extending essentially parallel with a central longitudinal axis of the filter element. Hence, the outer circumferential face can be construed as a radial boundary of the filter medium pack. The filter medium pack further comprises a first outer axial face and a second outer axial face transverse to the central longitudinal axis and thereby forming an axial boundary of the filter medium pack.

For proper operation of a filter element, it is essential that the filter medium pack is properly sealed to the housing wherein the filter medium pack is inserted. Therefore, present filter elements comprise besides the filter medium pack also a seal arrangement attached to the filter medium pack and configured for sealing the gap between the filter medium pack and the housing so as to maintain filtered fluid separated from unfiltered fluid.

Various types of seal arrangements for a filter element have been proposed. For example, the seal arrangement can be formed by foamed polyurethane (PU) obtained by a moulding technique. In U.S. Pat. No. 7,396,376, a foamed polyurethane (PU) seal arrangement is disclosed that is used in combination with a fluted filter medium pack. During the manufacturing process the filter medium pack is placed in a mould together with a reinforcing frame element. Thereafter the mould is filled with PU and following a rising process, a so-called overmold of foamed PU is formed.

One of the disadvantages of these filter elements is that the manufacturing process is time consuming and the integration of the seal arrangement with the filter medium pack involves a non-negligible cost of the filter element.

As the filter element has to be construed as an element that is to be removed and replaced from a housing of the filter system at regular time intervals, the overall maintenance cost of the filter system is influenced by the cost of a single filter element.

Hence, there is room for improving filters elements and filter systems comprising a filter element.

SUMMARY

It is an object of embodiments of the present invention to provide a cost-effective filter element for filtering fluids and reduce the number of natural resources required to manufacture the filter element. A further objective of embodiments of the present invention is to reduce the risk of incorrect installation of filter elements in filter systems. It is a further object of the disclosure to provide a filter system wherein, during maintenance of the filter system, the seal assembly forming a seal between the filter medium pack and the housing does not unnecessarily need be replaced at the same time the filter media require replacement.

Indeed, the present disclosure is based, at least in part, on the insight of the inventors that the time intervals required for replacing current filter elements due to a reduced filtering efficiency of the filter media, is shorter than a time interval that would require the replacement of the sealing member. As currently the sealing member is an integrated part of the filter element and attached to the filter media by a glue or through a moulding technique, replacing the filter element implicitly involves replacing the seal arrangement.

The present invention is defined in the appended independent claims. The dependent claims define advantageous embodiments.

According to a first aspect of the present disclosure a filter element for insertion into a housing of a filter system is provided.

In embodiments, the filter element for insertion into a housing of a filter system comprises a filter medium pack for filtering a fluid, having an outer circumferential face extending between a first outer axial face and a second outer axial face opposite the first outer axial face, and wherein the filter element is characterized in that the filter element comprises a seal receiver sealingly attached to the filter medium pack and wherein the seal receiver comprises a closed-loop surface suitable for receiving a removable circumferential seal member, and in that the closed-loop surface forms a contour shape with single-fold rotational symmetry.

In embodiments, in addition to the single-fold rotational symmetry, the contour shape of the closed-loop surface has mirror symmetry with respect to a mirror plane crossing the first and second outer axial face of the filter medium pack.

In embodiments according to the present disclosure, the filter element for insertion into a housing of a filter system comprises a filter medium pack for filtering a fluid, having an outer circumferential face extending between a first outer axial face and a second outer axial face opposite the first outer axial face, and wherein the filter element is characterized in that the filter element comprises a seal receiver sealingly attached to the filter medium pack, and wherein the seal receiver comprises a closed-loop surface for receiving a removable circumferential seal member, and in that the closed-loop surface forms a contour shape having a single plane of mirror symmetry and wherein the single plane of mirror symmetry is crossing the first and second outer axial face.

In embodiments, the filter element according to the present disclosure does not comprise a seal member.

In other words, embodiments of a filter element according to the present disclosure do not comprise a circumferential seal member coupled to the filter medium pack for sealing the filter medium pack to the housing of the filter system. Hence, embodiments of filter elements according to the present disclosure do not support any circumferential seal member for sealing the filter medium pack to the housing of the filter system. Instead, the filter element according to the present disclosure comprises a seal receiver attached to the filter medium pack and wherein the seal receiver comprises a closed-loop surface for receiving a removable circumferential seal member. The removable circumferential seal member is coupled to or supported by a separate device, separated from the filter element. In embodiments the separated device that is supporting the removable circumferential seal member is a seal carrier forming a removable interface between the filter element and the housing of the filter system. In other embodiments, no removable seal carrier is used and the removable seal is directly coupled to a wall portion of the housing of the filter system.

In embodiments, the filter element according to the present disclosure does not comprise a seal member attached to the closed-loop surface.

In embodiments, the filter element does not comprises a seal member that is adhesively coupled to the closed-loop surface.

In embodiments according to the present disclosure, the seal receiver does not comprises a groove or a recess for supporting a seal member.

Advantageously, by providing a seal receiver with a closed-loop surface having a contour shape with single-fold rotational symmetry, a unique orientation of the filter element for insertion into the filter housing and for making a coupling with a seal member is defined.

Advantageously, as the filter element does not comprise a seal member attached to the filter media but instead comprises a seal receiver for receiving a removable seal member, when performing maintenance, the filter media can be replaced without necessarily replacing the seal member.

A closed-loop surface with a contour shape with single-fold rotational symmetry has to be construed as a contour shape configured such that when rotating the closed-loop surface, only after a rotation of 360° the contour shape matches up with the initial contour shape when starting the rotation. In other words, only after a 360° rotation the contour shape looks the same as at the start of the rotation.

A contour shape with single-fold rotational symmetry has no axis of rotational symmetry. In contrast, contour shapes with rotational symmetry have an axis of rotational symmetry such that after rotating around an angle of 180° or less around the axis of rotational symmetry, the contour shape matches up with the initial contour shape at the start of the rotation.

In embodiments, the closed-loop surface of the seal receiver is a non-planar surface.

In embodiments, the contour shape formed by the closed-loop surface of the seal receiver corresponds to or partly corresponds to a contour shape of the outer circumferential face of the filter medium pack.

In other embodiments, the contour shape formed by the closed-loop surface corresponds to a contour shape of a circumferential non-planar surface forming the first axial face of the filter medium pack.

The term "corresponds to" is used herein to indicate that the outer shape of the circumferential face of the filter medium pack or the shape of the first outer axial face of the filter medium pack is closely following the contour shape of the closed-loop surface. In other words, a distance between the contour of the closed-loop surface of the seal receiver and the contour of the outer circumferential face or the contour of the first outer axial face of the filter medium pack does not vary considerably along its contour.

In some embodiments, the seal receiver is a belt-shaped seal receiver.

In embodiments, the seal receiver is circumscribing and sealingly attached to the outer circumferential face of the filter medium pack. In other embodiments, the seal receiver is sealingly attached to the first outer axial face of the filter medium pack or to a border of the first axial face of the filter medium pack.

In some embodiments, the contour shape formed by the closed-loop surface comprises at least one concave contour portion and/or one convex contour portion for generating the single-fold rotational symmetry of the closed-loop surface.

In embodiments, the seal receiver is attached or at least partly attached to the first or second outer axial face of the filter medium pack.

In embodiments, the seal receiver is attached or at least partly attached to the outer circumferential face of the filter medium pack.

In embodiments, the seal receiver is attached or at least partly attached to an end portion of the outer circumferential face of the filter medium pack.

In embodiments, the seal receiver comprises an engaging element configured for engaging with a snap-fit connector or for engaging with a latch. Examples of engaging elements are: a slot, a slit, a ridge, a groove portion, an indentation, an edge portion, a recess portion, an undercut, a depression or any profile suitable for engaging with a snap-fit connector or for engaging with a latch. Advantageously, by providing an engaging element to the seal receiver, a snap-fit connection or a latch connection between the seal receiver and a seal carrier supporting the removable circumferential seal member can be made by using a snap-fit connector or a latch. The snap-fit connector or latch is for example coupled to the seal carrier.

In other embodiments, the seal receiver comprises a snap-fit connector or a latch coupled to a portion of the seal receiver. Advantageously, by engaging the snap-fit connector or the latch with an engaging element of a seal carrier, the seal receiver and the seal carrier can be removeably connected.

In embodiments, the filter medium pack comprises a central longitudinal axis Z extending from the first to the second axial face. The first and second axial face are transverse to the longitudinal axis Z. Hence, the outer circumferential face can also be named outer radial circumferential face.

In embodiments, the contour shape of the closed-loop surface has a single-fold rotational symmetry with respect to rotation along a central longitudinal axis Z of the filter medium pack.

In embodiments, the contour shape of the closed-loop surface has a single-fold rotational symmetry with respect to rotation along a central longitudinal axis Z of the filter medium pack, and wherein the central longitudinal axis is extending from a centroid of the first axial face of the filter medium pack to a centroid of the second axial face of the filter medium pack.

In embodiments wherein the filter medium pack comprises fluted filter media, the first and second outer axial face correspond to respectively a fluid entrance face and a fluid exit face or alternatively correspond to respectively a fluid exit face and a fluid entrance face.

In embodiments wherein the filter medium pack comprises pleated filter media, the seal receiver is sealingly attached to the first outer axial face of the filter medium pack.

In some embodiments wherein the filter medium pack comprises pleated filter media, the filter medium pack has a hollow shape and the seal receiver forms an open end cap for the filter medium pack for receiving unfiltered fluid or for evacuating filtered fluid. In these embodiments, preferably a closed end cap is sealingly attached to the second outer axial face of the filter medium pack.

In embodiments of filter elements, the closed-loop surface of the seal receiver is any of the following: a radially inward-facing surface, a radially outward-facing surface or an axially-facing surface with respect to a central longitudinal axis Z extending from the first 7a to the second 7b outer axial face.

According to a second aspect of the present disclosure, a filter assembly comprising a filter element and a seal carrier is provided. The seal carrier forms a removable interface between the filter element and a housing of a filter system. The seal carrier comprises a first and a second circumferential seal member supported by a seal supporting structure of the seal carrier. The contour shape of the first circumferential seal member is configured for matching with the contour shape of the closed-loop surface of the seal receiver of the filter element. In this way, when the filter element is inserted in the housing of the filter system, the first circumferential seal member forms a seal between the filter element and the seal carrier. The second circumferential seal member is configured for forming a seal between the seal carrier and the housing of the filter system.

In embodiments, the seal supporting structure of the seal carrier comprises a first circumferential support portion configured for supporting the first circumferential seal member and a second circumferential support portion configured for supporting the second circumferential seal member.

In embodiments, the first and second circumferential seal are attached to the seal supporting structure of the seal carrier.

Advantageously, as the seal carrier forms a removable interface supporting the first and the second circumferential seal member, when performing maintenance of the filter system, the filter element can be replaced while the first and second circumferential seal members supported by the seal supporting structure of the seal carrier can be re-used as long as the seal members are not worn out. Hence, the cyclic periods for replacing the filter medium pack and the seal assembly can be different.

Advantageously, as the contour shape of the closed-loop surface of the seal receiver has a single-fold rotational symmetry and the contour shape of the first circumferential seal member is configured for matching with the contour shape of the closed-loop surface, when replacing a filter element and re-using the first circumferential seal member, the first circumferential seal member is always positioned in the same position with respect to the filter element.

Preferably, the seal carrier is manufactured together with the first and second circumferential seal member by applying a multi-component injection moulding manufacturing process. In this way, the seal carrier together with the first and second circumferential seal member forms a single part.

In embodiments, the filter assembly comprises a snap-fit connector and the seal receiver and the seal carrier are configured for engaging with the snap-fit connector. In this way, a removable connection can be established between the seal receiver and the seal carrier.

In further embodiments, the filter assembly comprises a clamp for clamping the seal carrier to the filter element.

In embodiments, a filter element for insertion into a housing of a filter system can include a media pack for filtering a fluid, the media pack defining an outer circumferential face extending between a first axial face and a second axial face, and a seal receiver sealingly attached to the media pack. The seal receiver can include a closed-loop surface for receiving a separately formed circumferential seal member, wherein the closed-loop surface forms a contour shape with single-fold rotational symmetry, and an engaging element for removably securing the circumferential seal member to the seal receiver.

In embodiments, the contour shape of the closed-loop surface is mirror symmetric with respect to a mirror plane crossing said first and second axial face.

In embodiments, the seal receiver comprises a material having a hardness either measured on a shore-A scale between 60 and 100.

In embodiments, the closed-loop surface is a non-planar surface.

In embodiments, the closed-loop surface of the seal receiver is any of the following: a radially inward-facing surface; a radially outward-facing surface; or an axially-facing surface with respect to a central longitudinal axis extending from the first to the second axial face.

In embodiments, the engagement element is one of a first component of a snap-fit connection and an extension member configured to receive a latch member.

In embodiments, the media pack comprises fluted filter media.

In embodiments, a contour shape of the outer circumferential face of the media pack has a single-fold rotational symmetry and wherein the contour shape formed by the closed-loop surface of the seal receiver corresponds at least partially to the contour shape of the outer circumferential face of the media pack.

In embodiments, the seal receiver circumscribes and sealingly attaches to the outer circumferential face of the filter medium pack or sealingly attaches to a border of the first axial face of the media pack, or is both attached to a border of the first axial face and to the outer circumferential face of the media pack.

In embodiments, the media pack comprises pleated filter media.

In embodiments, the seal receiver is sealingly attached to the first axial face of the media pack.

In embodiments, the first axial face is formed by a circumferential non-planar surface having a contour shape corresponding with the contour shape formed by the closed-loop surface of the seal receiver.

In embodiments, the media pack has a hollow shape and wherein at an end of the media pack the outer circumferential face comprises one or more battlements or alternatively one or more notches configured for forming said circumferential non-planar surface of the first axial face.

In embodiments, the media pack has a hollow shape and wherein the seal receiver forms an open end cap for the media pack for receiving unfiltered fluid or for evacuating filtered fluid, preferably a closed end cap is sealingly attached to the second axial face of the media pack.

In embodiments, the seal receiver is at least partly attached to the first or the second axial face of the media pack.

In embodiments, the seal receiver is at least partly attached to the outer circumferential face of the media pack.

In embodiments, the seal receiver is at least partly attached to an end portion of the outer circumferential face of the media pack.

In embodiments, the seal receiver comprises a circumferential first side and an opposing circumferential second side and wherein the circumferential first side comprises said closed-loop surface and wherein at least a portion of the circumferential second side is attached to the outer circumferential face of the media pack.

In embodiments, the seal receiver comprises a circumferential first side and an opposing circumferential second side and wherein the circumferential first side comprises said closed-loop surface and wherein at least a portion of the circumferential second side is attached to the first or second axial face of the media pack.

In embodiments, the seal receiver has the shape of a belt.

In embodiments, the seal receiver comprises a circumferential side wherein a first circumferential portion of said circumferential side forms said closed-loop surface and wherein a second circumferential portion of said circumferential side is attached to the first or second axial face of the media pack.

In embodiments, the closed-loop surface is a smooth surface.

In embodiments, the filter element does not include a deflectable or compressible seal member.

In embodiments, the filter element does not include a seal member attached to the closed-loop surface.

In embodiments, the seal receiver does not include a groove or a recess for supporting a seal member.

In embodiments, the seal receiver comprises a single closed-loop surface configured for receiving a single removable circumferential seal member.

In embodiments, a filter assembly can include a filter element with any of the previously-described features and a seal carrier for forming a removable interface between the filter element and the housing of the filter system, the seal carrier comprising: a first circumferential seal member for forming a seal between the filter element and the seal carrier; and wherein a contour shape of the first circumferential seal member is configured for matching with the contour shape of the closed-loop surface of the seal receiver of the filter element, a second circumferential seal member for forming a seal between the seal carrier and the housing of the filter system, and a seal supporting structure supporting said first and said second circumferential seal member.

In embodiment, a filter housing receiving any of the previously-described filter elements may be provided.

In embodiments, a filter system can include a filter element a filter element with any of the previously-described features, a filter housing configured for receiving said filter element, and a circumferential seal member coupled to a wall portion of the filter housing and configured for forming a seal between the filter element and the filter housing, and wherein a contour shape of said circumferential seal member is configured for matching with the contour shape of the closed-loop surface of the seal receiver.

In embodiments, a filter element for insertion into a housing of a filter system can include a media pack for filtering a fluid, the media pack defining an outer circumferential face extending between a first axial face and a second axial face, and a seal receiver sealingly attached to the media pack, the seal receiver including: a closed-loop surface for receiving a separately formed circumferential seal member, wherein the closed-loop surface forms a contour shape having a single plane of mirror symmetry and wherein said single plane of mirror symmetry extends between the first and second axial faces; and an engaging element for removably securing the circumferential seal member to the seal receiver.

In embodiments, a filter element for insertion into a housing of a filter system can include a media pack for filtering a fluid, the media pack defining an outer circumferential face extending between a first axial face and a second axial face; and a seal receiver sealingly attached to the media pack, the seal receiver: defining a closed-loop surface for receiving a separately formed circumferential seal member; being formed from a material having a hardness on a shore-A scale between 60 and 100 or having a hardness on a shore-D scale between 0 and 100; and including an engaging element for securing the circumferential seal member to the seal receiver.

SHORT DESCRIPTION OF THE DRAWINGS

These and further aspects of the present disclosure will be explained in greater detail by way of example and with reference to the accompanying drawings in which:

FIG. 4a to FIG. 4j show a portion of a cross-section between a median plane and various embodiments of filter elements having seal receivers with various contour shapes.

Figure 9:
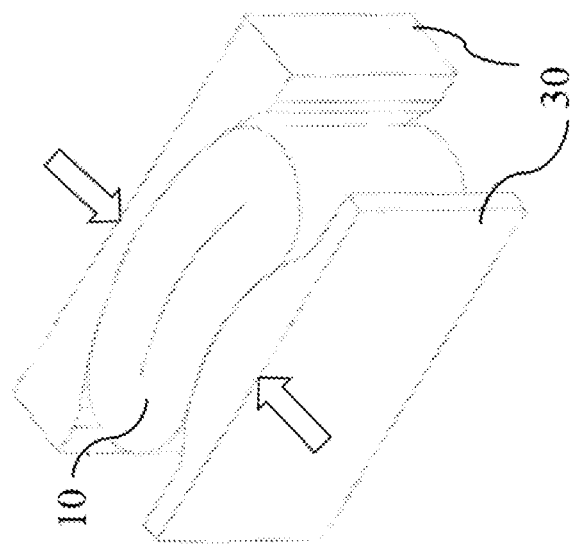

FIG. 9 schematically illustrates a press-mold for forming a filter medium pack with single-fold rotational symmetry.

Figure 10B:
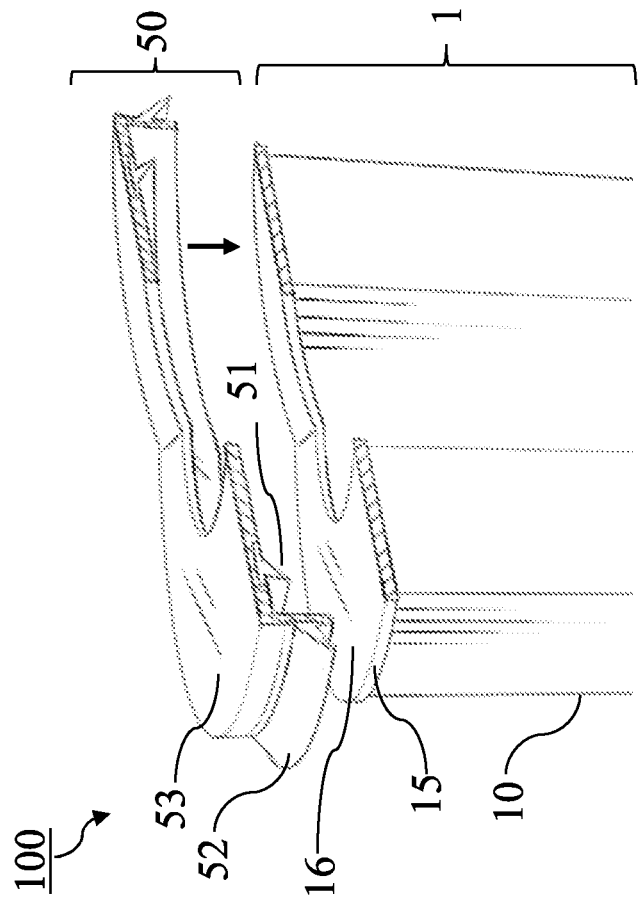
Figure 10A:
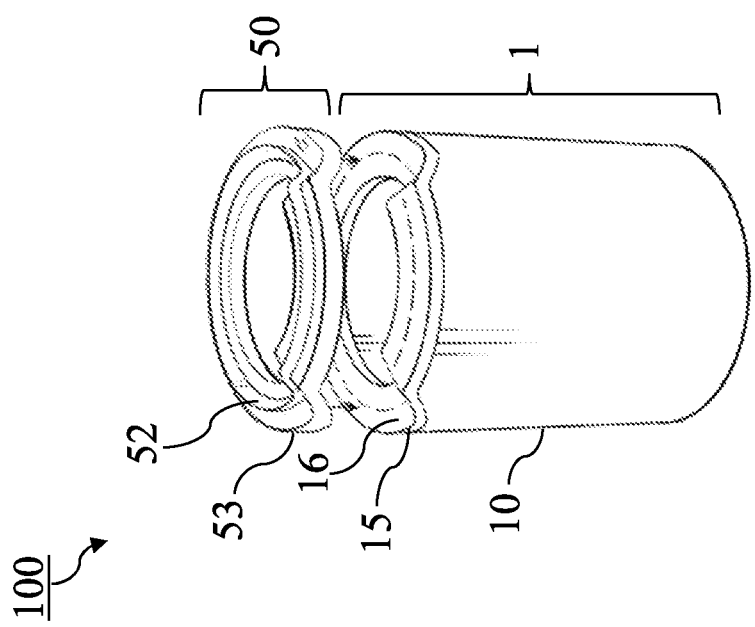

FIG. 10a and FIG. 10b show exploded views of exemplary embodiments of filter assemblies comprising a filter element with an axially attached seal receiver and an associated seal carrier.

Figure 11B:
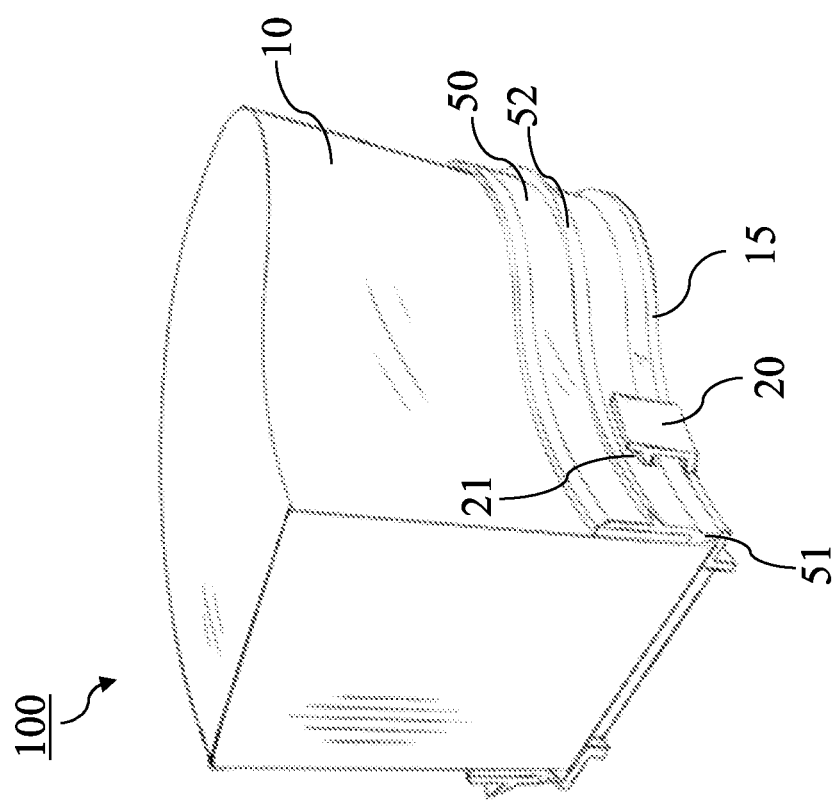
Figure 11A:
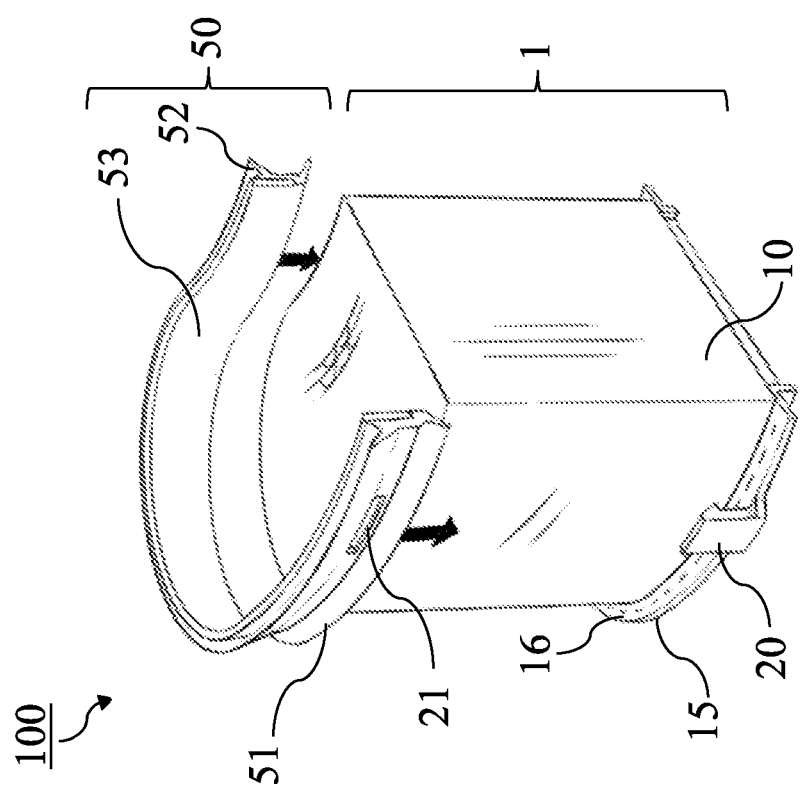

FIG. 11a and FIG. 11b show an example of an embodiment of a filter assembly wherein the seal carrier and the seal receiver are connected with a snap-fit connector.

FIG. 12a and FIG. 12b show exploded views of exemplary embodiments of filter assemblies comprising a filter element with a radially attached seal receiver and an associated seal carrier.

Figure 13:
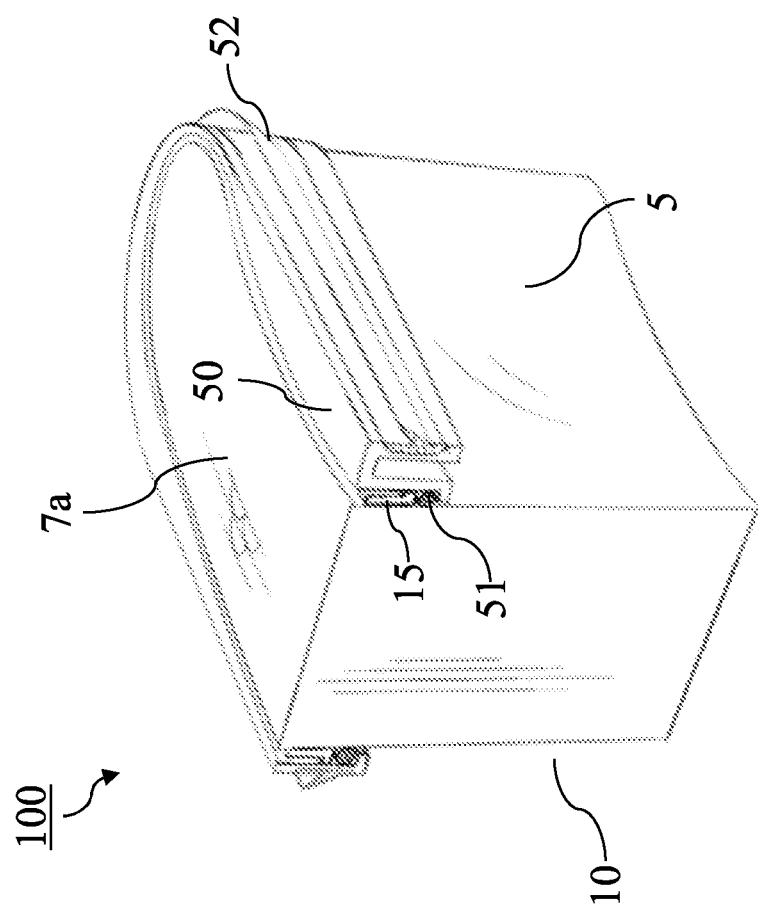

FIG. 13 shows a perspective view of a further embodiment of a filter assembly comprising a filter element with a seal receiver and an associated seal carrier.

Figure 14:
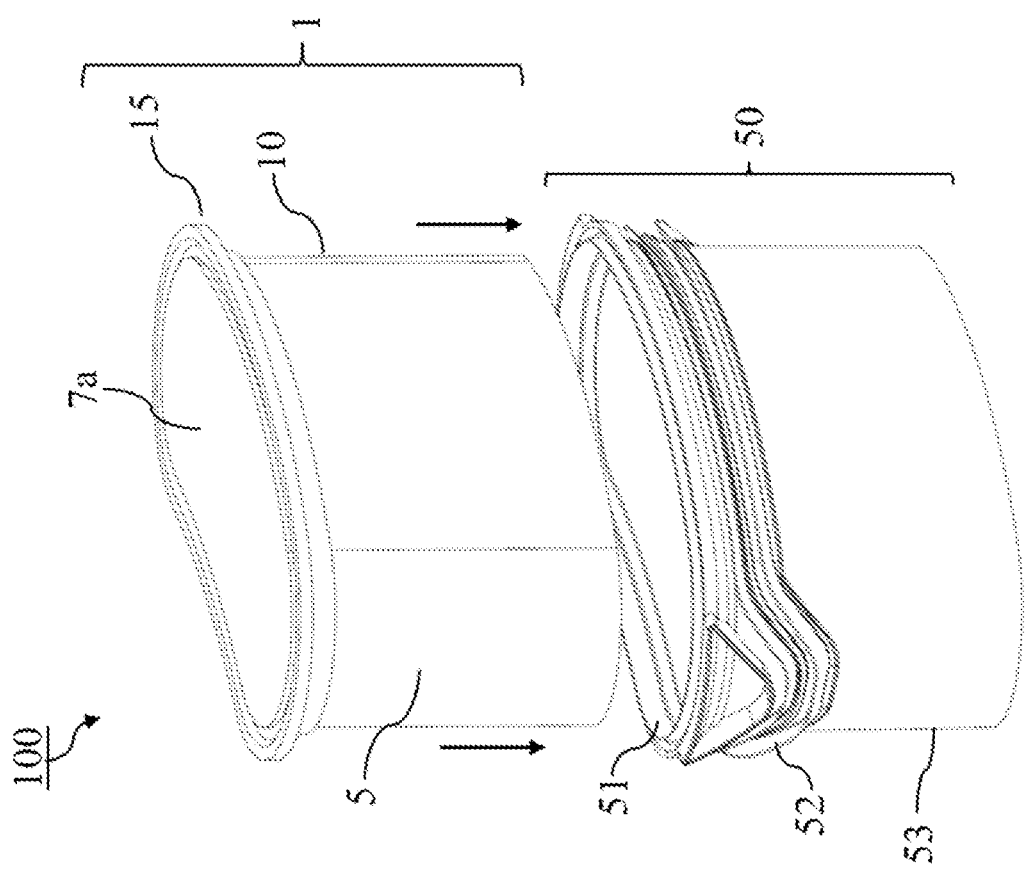

FIG. 14 shows an exploded view of an embodiment of a filter assembly wherein the seal carrier comprises a shell forming a support element for a first and second circumferential seal.

Figure 15:
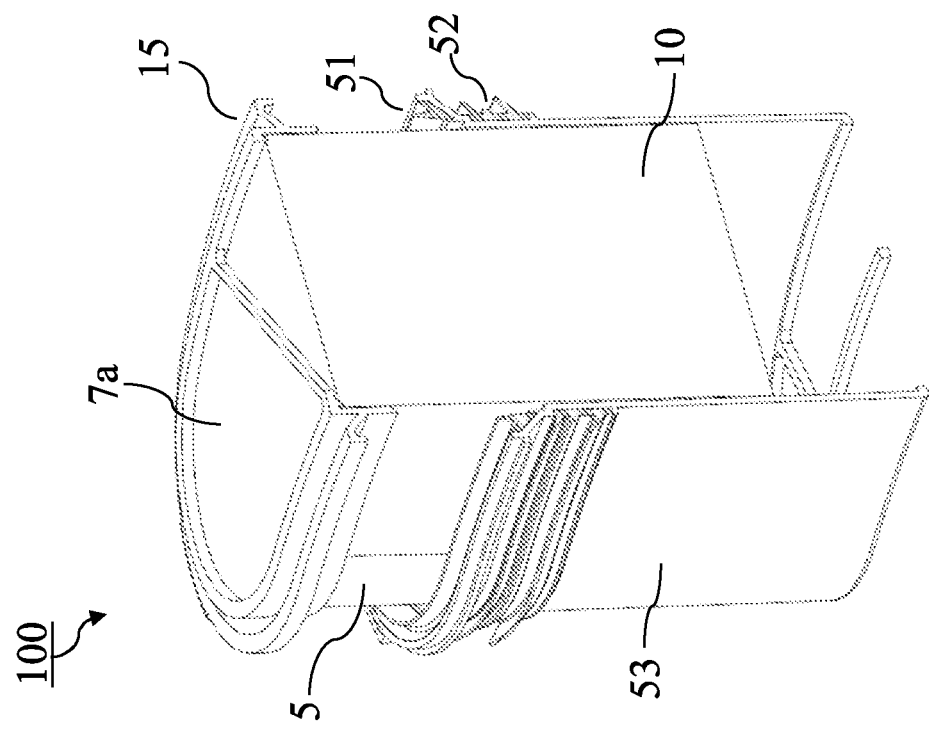
Figure 16:
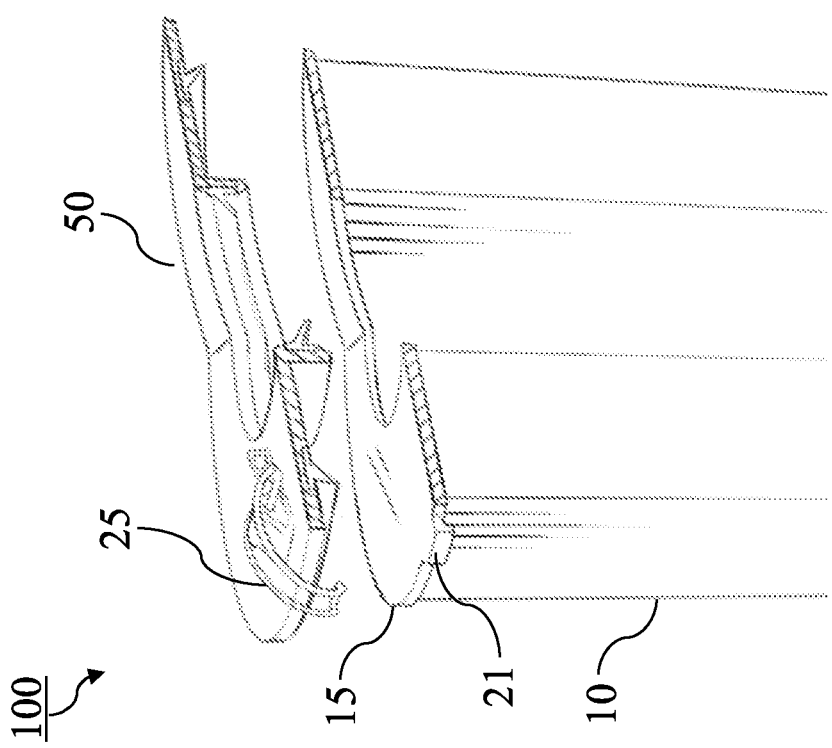

FIG. 15 shows a cross sectional view the filter assembly of FIG. 14,

FIG. 16 shows an exploded view of an embodiment of a filter assembly wherein the seal receiver comprises an engaging element for engaging with a latch coupled to the seal carrier.

Figure 17:
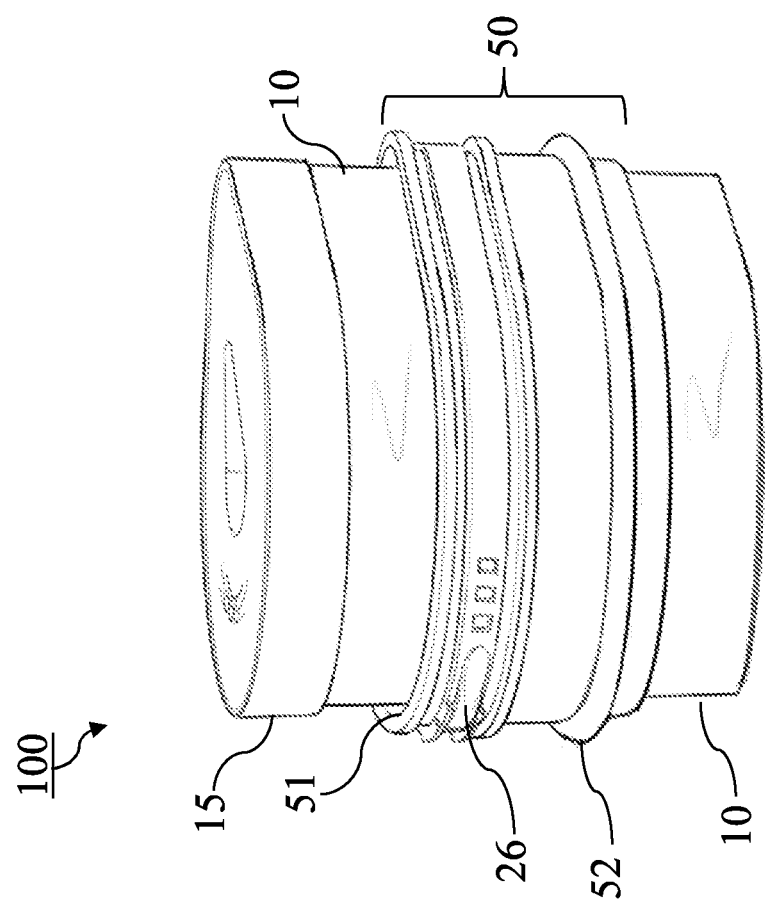

FIG. 17 shows an embodiment of a filter assembly comprising a clamp for clamping the seal carrier to the filter element.

The drawings of the figures are neither drawn to scale nor proportioned. Generally, identical components are denoted by the same reference numerals in the figures.

DETAILED DESCRIPTION OF EMBODIMENTS

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

Although a number of the drawings presented and discussed below are specifically addressing embodiments of a filter element for filtering air, the present disclosure is not limited to filter elements for filtering any particular fluid. The fluid is for example a gas such as air.

When the wording "contour shape with single-fold rotational symmetry" or "object with single-fold rotational symmetry" is used throughout the present disclosure, it has to be construed as a contour shape or object with discrete rotational symmetry of the first order, i.e., when rotating the contour shape or object, only after a rotation of 360° the contour shape or object matches up, i.e., only after a 360° rotation the contour shape or object looks the same as at the start of the rotation. For example, a closed-loop surface with a contour shape with single-fold rotational symmetry has to be construed as a contour shape configured such that when rotating the closed-loop surface the contour shape only matches up after a rotation of 360°.

The single-fold rotational symmetry is generally also named 1-fold rotational symmetry. In other words, a contour shape or an object with single-fold rotational symmetry has no rotational symmetry. In contrast, with rotational symmetric objects or rotational symmetric contour shapes having for example an N-fold rotational symmetry, with N>1, an object or contour shape looks the same after a rotation of 360°/N. Rotational symmetric objects or rotational symmetric contour shapes have a rotation axis of order N, with N>1. Objects or contour shapes with single-fold rotational symmetry have no axis of rotational symmetry as is the case with a rotational symmetric object or contour shape that after rotating around an angle of 180° or less around the rotation axis match up.

When the wording "mirror symmetry" or "mirror symmetric" is used throughout the present disclosure, it has to be construed as reflection symmetry, i.e., when in three dimensions, a mirror-symmetric object comprises a plane of mirror symmetry, further named mirror plane. For each half of a mirror-symmetric object on a first side of the plane of mirror symmetry, there is another half object on a second side of the plane of mirror symmetry such that every point of the half object on the first side has a one-to-one equidistant mapping onto another point of the other half object on the second side of the plane of mirror symmetry. When in two dimensions, mirror symmetry implies the presence of an axis of symmetry and when folding the two-dimensional object in half over the axis of symmetry, the two halves would be identical.

Filter Element, General

A filter element is a replaceable part that can be inserted into a housing of a filter system. Exemplary embodiments of filter elements 1 according to the present disclosure wherein the filter element comprises a filter medium pack 10 for filtering a fluid and a seal receiver 15 are schematically shown in FIG. 1*a* to FIG. 2*h*. As illustrated on these figures, the filter medium pack 10 has an outer circumferential face 5 extending between a first outer axial face 7*a* and a second outer axial face 7*b* opposite the first outer axial face. Hence, the outer circumferential face 5 forms a radial boundary of the filter medium pack and the first and second axial face form an axial boundary of the filter medium pack. The outer circumferential face 5 can also be named outer radial circumferential face. For illustrative purposes, in FIG. 2*c* to FIG. 2*g*, only half of a filter element is shown.

Figure 1B:
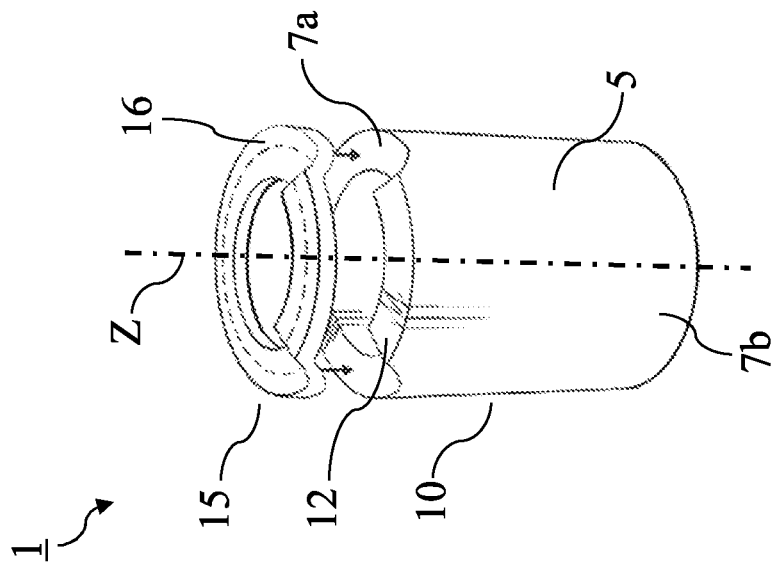
FIG. 1a and FIG. 1b show exploded views of embodiments of filter elements according to the present disclosure wherein a seal receiver is attached to an axial face of the filter medium pack.
Figure 1A:
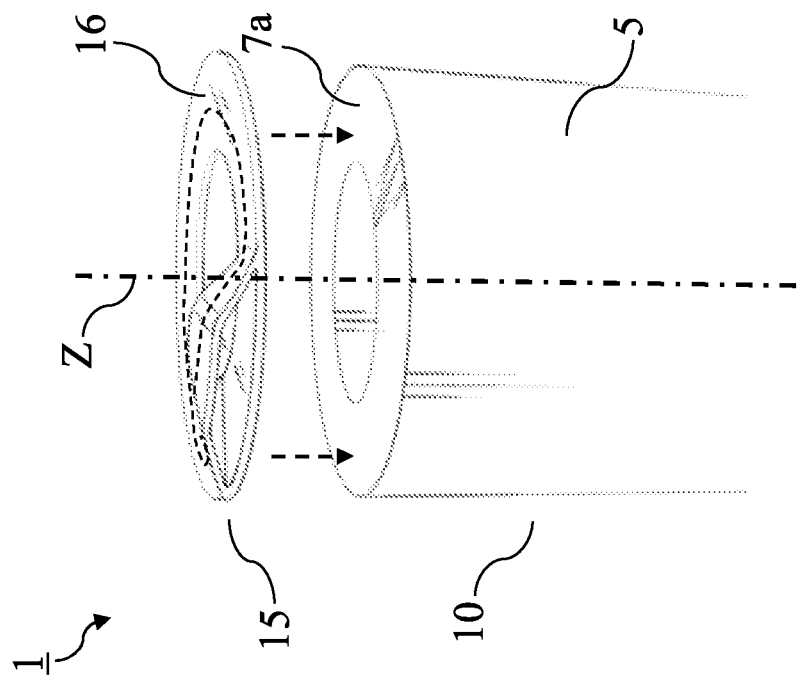

In embodiments, as illustrated on for example FIG. 1*a* and FIG. 1*b*, the outer circumferential face 5 is extending essentially parallel with a central longitudinal axis Z of the filter element. The central longitudinal axis Z is an axis extending in a direction from the first to the second axial face of the filter medium pack 10 and can be construed as a central axis of the filter medium pack 10.

For embodiments wherein the first and second axial face are for example formed by planar surfaces, as shown on FIG. 1*a* and FIG. 2*a* to FIG. 2*g*, the central longitudinal axis Z is generally extending from the centroid of the first axial face 7*a* to the centroid of the second axial face 7*b* of the filter medium pack 10. The centroid of a planar surface is the arithmetic mean position of all the points of the surface.

Figure 2A:
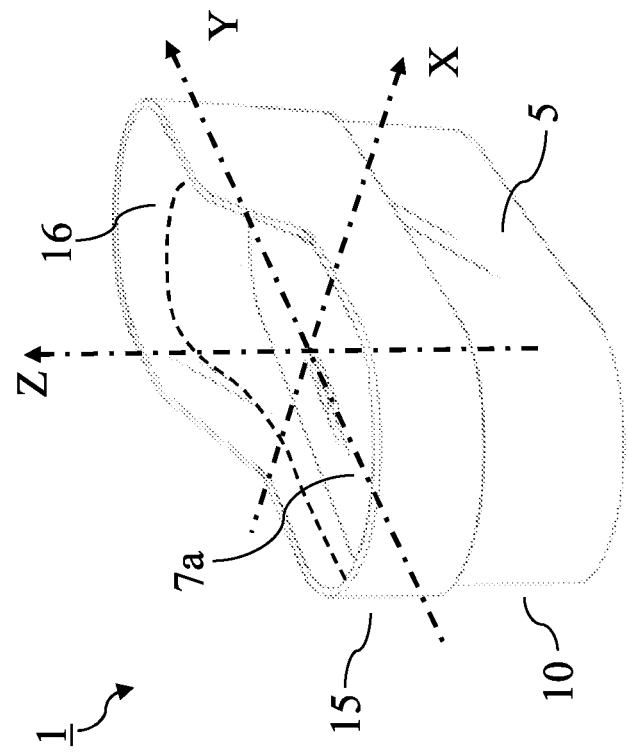
FIG. 2a to FIG. 2h show perspective views of embodiments of filter elements according to the present disclosure comprising a seal receiver and a filter medium pack.

For rotational symmetric filter medium packs, as shown for example in FIG. 1a and FIG. 2a, the central longitudinal axis Z coincides with the rotational axis of symmetry of the filter medium pack.

In other embodiments, the outer circumferential face can for example have a conical shape or any other suitable shape for forming an outer circumferential face extending between the first and second axial face.

The seal receiver 15 of the filter element 1 according to the present disclosure is sealingly attached to the filter medium pack, and the seal receiver 15 comprises a closed-loop surface 16 suitable for receiving a removable circumferential seal member. In FIG. 1a, FIG. 1b, FIG. 2g and FIG. 2h, embodiments of filter elements 1 are shown wherein the seal receiver 15 is sealingly attached to the first outer axial face 7a of the filter medium pack 10, whereas in FIG. 2a to FIG. 2f, embodiments of filter elements 1 are shown wherein the first circumferential portion of the seal receiver 15 is circumscribing and sealingly attached to the outer circumferential face 5 of the filter medium pack 10.

Figure 2B:
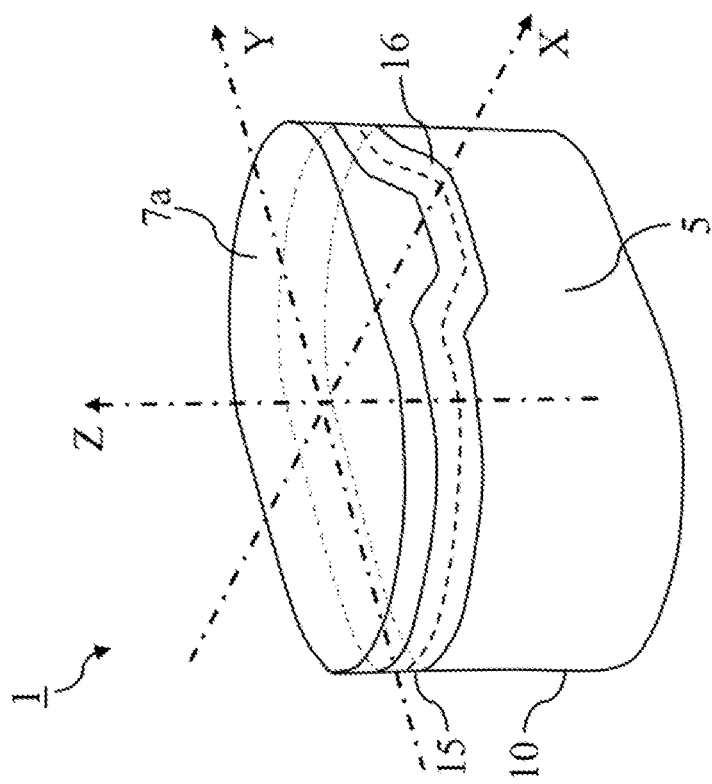
Figure 2C:
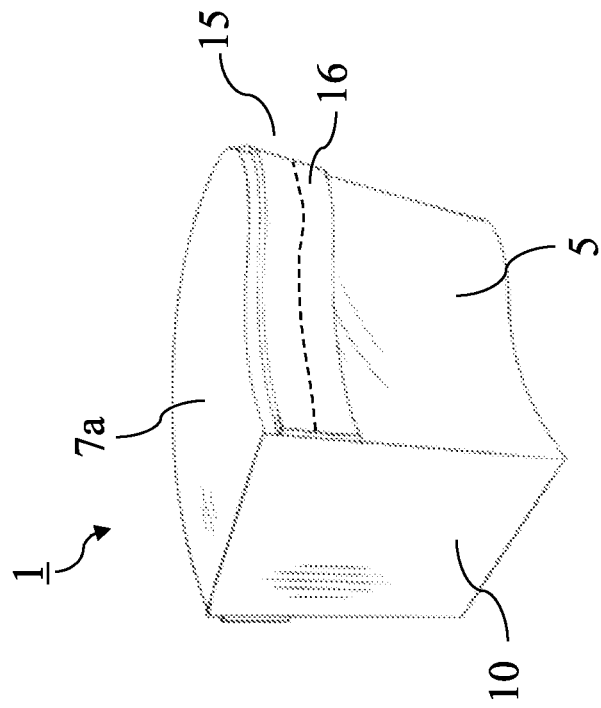
Figure 2D:
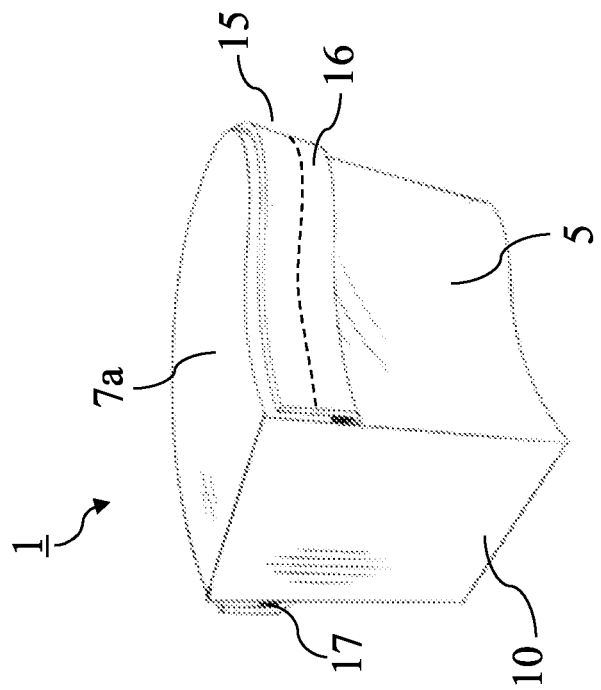
Figure 2F:
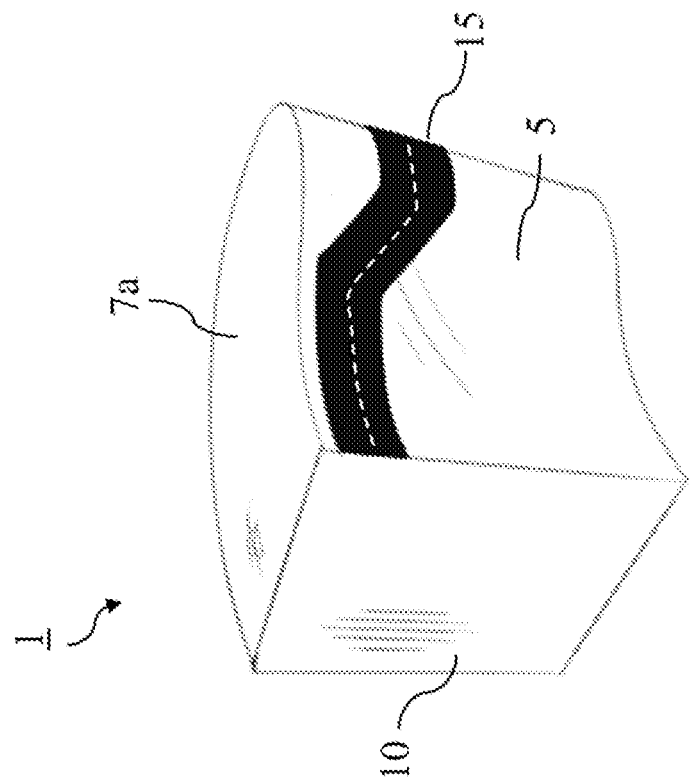
Figure 2E:
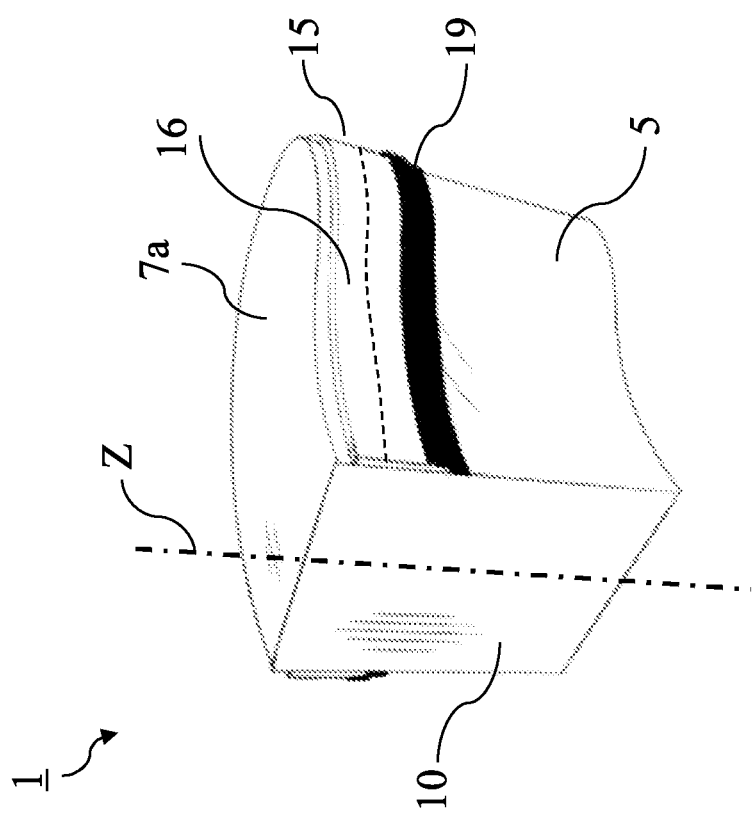
Figure 2H:
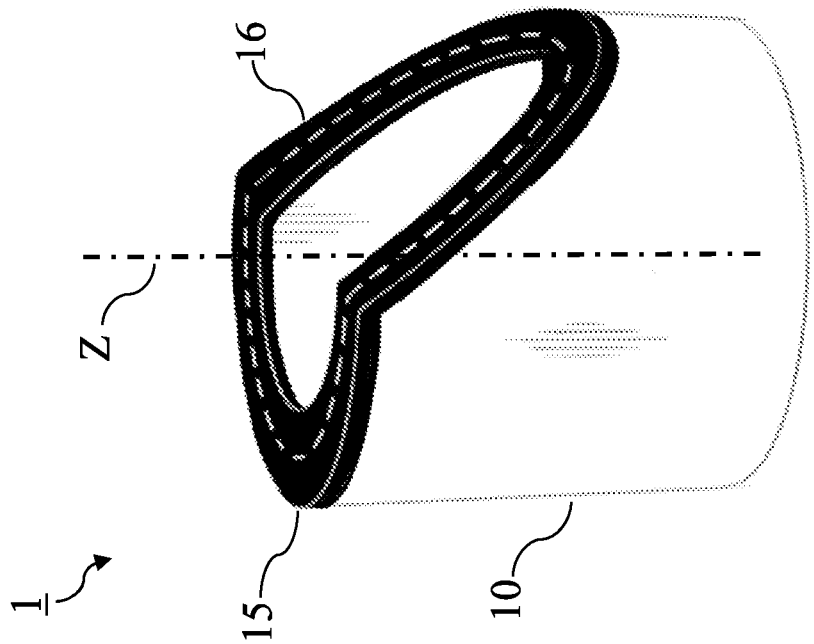
Figure 2G:
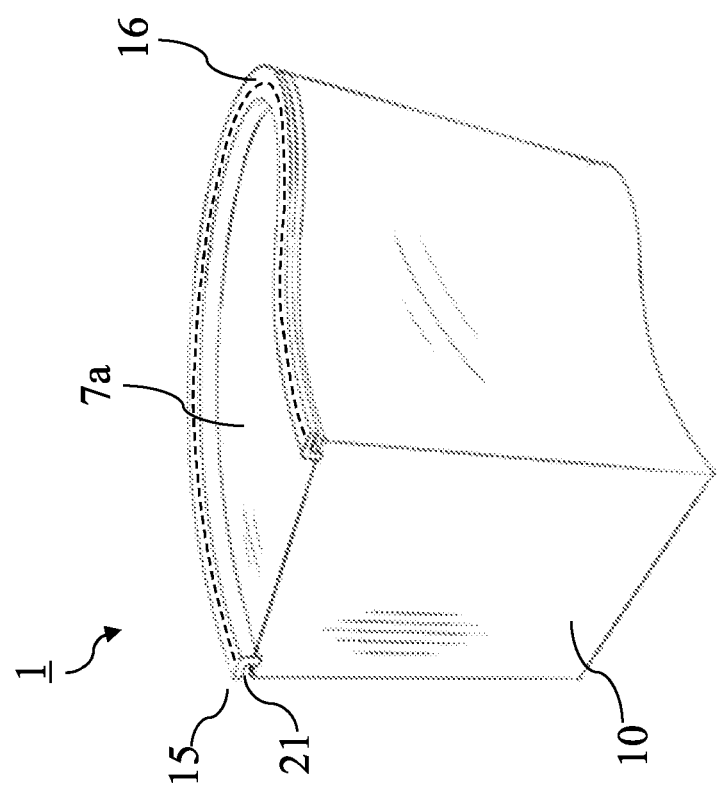

In embodiments as illustrated on FIG. 2g, the seal receiver 15 is sealingly attached to a border of the first outer axial face 7a of the filter medium pack. In further embodiments, as illustrated on FIG. 15, the seal receiver 15 is both attached to a border of the first outer axial face 7a and to the outer circumferential face 5 of the filter medium pack.

The filter element 1, according to embodiments of the present disclosure, is characterized in that the closed-loop surface 16 forms a contour shape with single-fold rotational symmetry. In other words, the contour shape of the closed-loop surface 16 has no rotational symmetry. Whatever rotational axis is selected, the seal receiver is always to be rotated by 360° to find back the same contour shape for the closed-loop surface 16. For example, if making a rotation along the central longitudinal axis Z of the filter medium pack, a rotation of 360° is to be made until the contour shape matches with the contour shape before starting the rotation.

The dotted line marked on the closed-loop surface 16 on FIG. 1a to FIG. 2h indicates the location where a removable circumferential seal member is to be received on the closed-loop surface.

As a consequence of the single-fold rotational symmetry of the contour shape of the seal receiver 15, when installing a new filter element in a housing of a filter system, the filter element can only be installed by holding the filter element in a specific orientation such that the reusable circumferential seal member, supported by for example a seal carrier, can correctly be received by the closed-loop surface of the seal receiver.

In further embodiments according to the present disclosure, in addition to the single-fold rotational symmetry, the contour shape of the closed-loop surface 16 has mirror symmetry with respect to a mirror plane crossing the first and second outer axial face of the filter medium pack. Examples of such embodiments are shown on FIG. 2a and FIG. 2b, wherein the plane Z-X and the plane Z-Y are respectively a plane of mirror symmetry.

In embodiments, the closed-loop surface 16 forms a contour shape having a single plane of mirror symmetry and wherein the single plane of mirror symmetry is crossing said first 7a and second 7b outer axial face of the filter medium pack. The embodiments shown on FIG. 2a and FIG. 2b are examples of embodiments wherein the contour shape has only a single plane of mirror symmetry, namely respectively planes Z-X and Z-Y. A single plane of mirror symmetry means that there is only one plane of mirror symmetry.

The advantage of filter elements with a contour shape of the closed-loop surface having mirror symmetry, is that it facilitates the positioning of the filter element in the housing of a filter system. For closed-loop surfaces without such a plane of mirror symmetry crossing the first 7a and second 7b outer axial face, as for example shown on FIG. 12a, it is less straightforward in what orientation to hold the filter element before inserting it in the housing of the filter system.

The attachment of the first circumferential portion of the seal receiver 15 to the filter medium pack 10 is made for example by a glue, a hotmelt glue technique, by using a shrink-wrap, by a moulding process or by any other attachment technique known in the art to sealingly attach the seal receiver to the filter medium pack. For example, in FIG. 2c, a filter element 1 embodiment is shown wherein a first circumferential portion of the seal receiver 15 is attached to the outer circumferential face 5 of the filter medium pack with a glue 17. In the filter element embodiment shown on FIG. 2e, the seal receiver 15 is attached to the outer circumferential face 5 using a shrink-wrap 19. In FIG. 2e, the shrink-wrap 19 is colored in black.

As outlined above, the embodiments of a filter element according to the present disclosure do not comprise a circumferential seal member coupled to the filter medium pack for sealing the filter medium pack to the housing of the filter system. In other words, embodiments of filter elements according to the present disclosure do not support any circumferential seal member for sealing the filter medium pack to the housing of the filter system.

In embodiments, the closed-loop surface 16 is a single closed-loop surface. In other words, the seal receiver 15 comprises a single closed-loop surface 16 such that the seal receiver 15 can only receive one removable circumferential seal member.

Seal Receiver

Figure 3C:
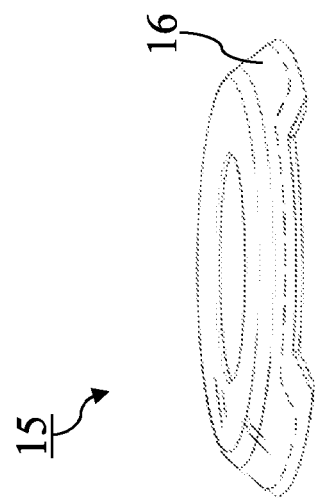
FIG. 3a to FIG. 3c show perspective views of various examples of embodiments of seal receivers according to the present disclosure.
Figure 3B:
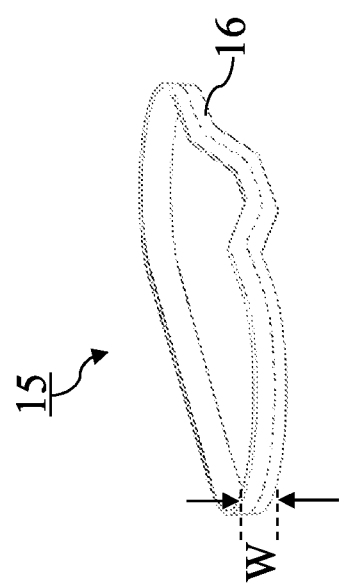
Figure 3A:
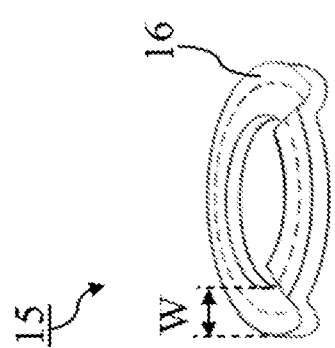

A number of exemplary embodiments of seal receivers 15 according to the present disclosure are shown in FIG. 3a to FIG. 3c. As schematically shown on these figures, each of these seal receivers 15 has a closed-loop surface 16 forming a contour shape with single-fold rotational symmetry. The dotted line on the closed-loop surface 16 schematically indicates a central location where the removable circumferential seal member is to be received when the filter element is inserted in the housing of the filter system.

The contours of the closed-loop surfaces of the seal receivers shown on FIG. 3a to FIG. 3c, are also mirror symmetric. Indeed, as discussed above, in some embodiments, when the seal receivers are attached to a filter medium pack, there is plane of mirror symmetry crossing the first and second outer axial face of the filter medium pack. For example the filter element of FIG. 2a comprises a seal receiver of the type shown on FIG. 3b, and in this example the plane X-Z is a mirror plane for the closed-loop surface of the seal receiver.

The seal receiver 15 is generally made of a hard material, more specifically covering materials from medium hard to hard and up to extra hard. To express and measure the hardness of a material, the known shore-A scale or shore-D scale can be used. In embodiments, the seal receiver 15 has a hardness either measured on a shore-A scale between 60 and 100, preferably between 70 and 100, more preferably between 80 and 100 or, alternatively, when measured on a shore-D scale between 0 and 100, preferably between 15 and 100, more preferably between 30 and 100. In this way, when the filter element is inserted in the filter housing, a circumferential seal member, supported for example by a seal carrier, is contacting and being pressed against the closed-loop surface 16 of the seal receiver, thereby forming a reliable seal.

In embodiments, the seal receiver 15 is for example made of a hard plastic.

In exemplary embodiments, the seal receiver comprises a thermoplastic, such as for example acrylonitrile butadiene styrene (ABS), polypropylene (PP), polyamide (PA) or polyvinyl chloride (PVC). With these materials, the seal receiver can be attached to the filter medium pack by for example thermal welding or by multi-component injection moulding.

In some embodiments wherein the seal receiver 15 is attached to the outer circumferential face 5 of the filter medium pack 10, the closed-loop surface 16 of the seal receiver is a radially outward-facing surface with respect to a longitudinal axis Z extending from the first to the second outer axial face, as illustrated on FIG. 2a, FIG. 4a, FIG. 4b, and FIG. 4h to FIG. 4j. Such a radially outward-facing surface has to be construed as a surface configured for receiving an outwardly directed seal.

In other embodiments, as illustrated for example on FIG. 2b, wherein the seal receiver 15 is attached to the outer circumferential face 5 of the filter medium pack 10, the closed-loop surface 16 of the seal receiver is a radially inward-facing surface. Such a radially inward-facing surface has to be construed as a surface configured for receiving an inwardly directed seal.

In embodiments, the contour shape formed by the closed-loop surface 16 comprises at least one concave contour portion such that the contour shape of the seal receiver has a single-fold rotational symmetry.

In embodiments, as illustrated on FIG. 2a, the closed-loop surface 16 comprises a step configured for generating a single-fold rotational symmetry.

In embodiments wherein the seal receiver is attached to the first outer axial face of the filter medium pack, as shown in FIG. 1a and FIG. 1b, the closed-loop surface 16 of the seal receiver is an axial-facing surface suitable for receiving an axial seal.

In embodiments, the seal receiver 15 comprises a circumferential first side and an opposing circumferential second side, and wherein the circumferential first side comprises the closed-loop surface 16 and wherein the circumferential second side or at least a portion of the circumferential second side of the seal receiver is attached to the outer circumferential face 5 of the filter medium pack. Examples of these type of embodiments are shown on FIG. 2a to FIG. 2f. In embodiments, as illustrated on FIG. 2a, the circumferential first side and the circumferential second side are respectively a circumferential external side and circumferential inner side of the seal receiver. In other embodiments, as illustrated on FIG. 2b, the circumferential first side and the circumferential second side are respectively a circumferential inner side and circumferential outer side of the seal receiver.

In other embodiments the seal receiver 15 comprises a circumferential first side and an opposing circumferential second side, and wherein the circumferential first side comprises the closed-loop surface 16 and the circumferential second side or at least a portion of the circumferential second side is attached to the first 7a or second 7b outer axial face of the filter medium pack. Examples of such embodiments are shown on FIG. 1a, FIG. 1b and FIG. 2h.

In embodiments as for example illustrated on FIG. 11a and FIG. 11b, the seal receiver 15 comprises a circumferential side wherein a first circumferential portion of said circumferential side forms said closed-loop surface 16 and wherein a second circumferential portion of said circumferential side is attached to the first 7a or second 7b outer axial face of the filter medium pack 10.

In embodiments, as for example illustrated on FIG. 3a and FIG. 3b, the seal receiver is belt-shaped having a belt-width W. In FIG. 2f, a perspective view of a further embodiment of a filter element wherein the seal receiver is attached to the outer circumferential face of the filter medium pack and wherein the seal receiver has a belt shape, is shown. On FIG. 2f, only half of the filter element is shown for illustrative purposes and the seal receiver 15 is colored in black, and wherein the white dotted line indicates the central location for receiving a circumferential seal.

Figure 5A:
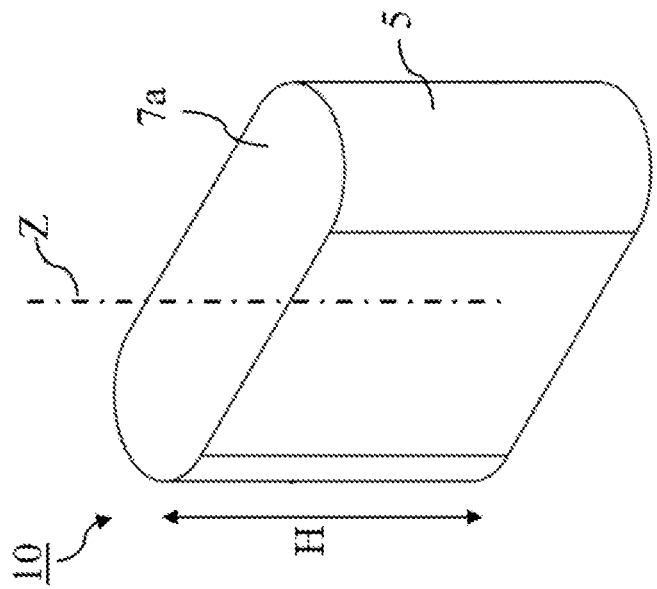
FIG. 5a and FIG. 5b show perspective views of embodiments of filter medium packs having rotational symmetry with respect to a central longitudinal axis Z.
Figure 5B:
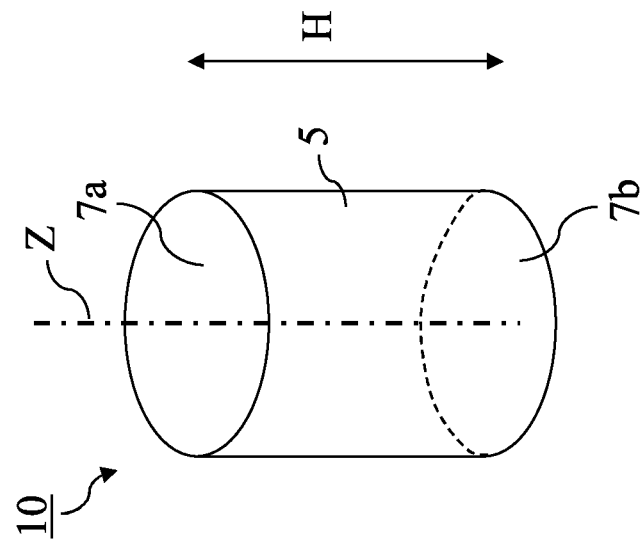

For embodiments wherein a belt-shaped seal receiver is attached to the outer circumferential face 5 of the filter medium pack, preferably, $0.05 \leq W/H \leq 0.5$, more preferably $0.05 \leq W/H \leq 0.30$, with H being a height of the filter medium pack corresponding to a distance measured between the first and second outer axial face of the filter medium pack as illustrated on FIG. 5a and FIG. 5b. For a filter medium pack comprising battlements 12 or notches 13, as shown on FIG. 6a to FIG. 6c, the height H corresponds to a maximum distance measured between the first and second outer axial face of the filter medium pack.

In some embodiments, as for example shown in FIG. 2c and FIG. 2d, the closed-loop surface 16 of the seal receiver is essentially parallel with a contour section of the outer circumferential face of the filter medium pack. In other words, in these embodiments, the contour shape formed by the closed-loop surface corresponds to the contour shape or a portion of the contour shape of the filter medium.

In other embodiments wherein the first axial side of the filter medium pack comprises a non-planar surface, as for example shown on FIG. 1b, the closed-loop surface 16 of the seal receiver is essentially parallel with the non-planar surface of the first axial side of the filter medium pack. On the other hand, in the embodiment shown in FIG. 1a, the first axial side 7a of the filter medium pack is planar while the closed-loop surface 16 is a non-planar surface. In FIG. 1a and FIG. 1b, the dotted circumferential line on the closed-loop surface 16 schematically indicates where the circumferential seal is to be received, thereby accentuating the single-fold contour shape of the closed-loop surface 16.

Further, the contour shape of the closed-loop surface 16 is not limited to a specific shape or limited to a specific orientation with respect to the filter medium pack. In FIG. 4a to FIG. 4j, a portion of a cross-section between a median plane and various embodiments of filter elements having seal receivers 15 with different contour shapes are shown. The median plane is plane crossing the first and second axial face of the filter medium pack.

In FIG. 4a to FIG. 4j the seal receiver 15 is either attached to the outer circumferential face 5 or attached to the first outer axial face 7a of the filter medium pack. The cross-section of the seal receiver is shown as a dotted area and the closed-loop surface 16 is accentuated by a full line. In FIG. 4a, a belt-shaped seal receiver 15, as discussed above, is shown wherein the closed-loop surface 16 is smooth and, depending on the type of embodiment, either parallel with the outer circumferential face 5 of the filter medium pack or parallel with the first outer axial face 7a. In FIG. 4b, a further example of an embodiment is shown wherein the closed-loop surface 16 is parallel with the outer circumferential face 5 of the filter medium pack or parallel with the first outer axial face 7a. In FIG. 4c and FIG. 4d, an embodiment of a seal receiver 15 is shown wherein the contour shape of the closed-loop surface 16 comprises an arc-shaped portion. Such an arc-shaped closed-loop surface is suitable for receiving for example a C-type or U-type of circumferential seal. In FIG. 4e, an embodiment is shown wherein the seal receiver has an angular-shaped contour. In FIG. 4f, an embodiment is shown wherein the closed-loop surface is configured for receiving for example a circumferential lip seal. In FIG. 4g a seal receiver similar to the seal receiver of FIG. 4a is shown. However in this example the closed-loop surface is oriented perpendicular to the outer circumferential face 5 or perpendicular to the first outer axial face 7a. For example, in embodiments wherein the closed-loop surface is oriented perpendicular to the outer circumferential face 5, the closed-loop surface can receive an axial seal.

In preferred embodiments of a seal receiver according to the present disclosure, as for example schematically illustrated on FIG. 2g, FIG. 4b, FIG. 4h and FIG. 4i, the seal receiver 15 comprises an engaging element 21 configured for engaging with a connector, for example a snap-fit connector, or for engaging with a latch.

Examples of engaging elements 21 for engaging with a snap-fit connector or with a latch are: a slot, a slit, a ridge, a groove portion, an indentation, an edge portion, a recess portion, an undercut, a depression or any profile suitable for engaging with a snap-fit connector. The engaging element 21 allows for making a snap-fit or latch connection between the seal receiver and a seal carrier supporting the removable circumferential seal member.

In embodiments, the snap-fit connector or latch is for example coupled to the seal carrier. This results in a removable connection between the seal receiver and the seal carrier. Typically, the snap-fit connector or the latch is a cantilever arm for bridging a distance between the seal receiver and the seal carrier. For example, in FIG. 16 an embodiment of a filter assembly is shown wherein the seal carrier 50 comprises a latch 25 and the seal receiver 15 comprises an engaging element 21 for engaging with the latch 25 of the seal carrier.

In other embodiments, the seal receiver comprises a snap-fit connector 20. The snap-fit connector 20 is for example rotatably or pliantly coupled to a portion of the seal receiver 15, as illustrated on FIG. 4j and FIG. 11a. In this way, as further illustrated on FIG. 11b, by engaging the snap-fit connector 20 with an engaging element 21 of a seal carrier 50, the seal receiver 15 and the seal carrier 50 can be removeably connected.

Filter Medium Packs, Shape

The filter medium packs 10 of the filter elements according to the present disclosure are not limited to a particular shape. Filter medium packs can have rotational symmetry or have a single-fold symmetry, i.e., not being symmetric. In FIG. 5a, an embodiment of a filter medium pack 10 is shown wherein the contour shape of the outer circumferential face 5 of the filter medium pack has a rotational symmetry of order two with respect to a longitudinal axis Z. In FIG. 5b, an embodiment of a cylindrically shaped filter medium pack 10 is shown, and hence the contour shape of the outer circumferential face 5 is fully symmetric with respect to the longitudinal central axis Z, i.e., the contour shape has a rotational symmetry of order infinity.

Figure 6C:
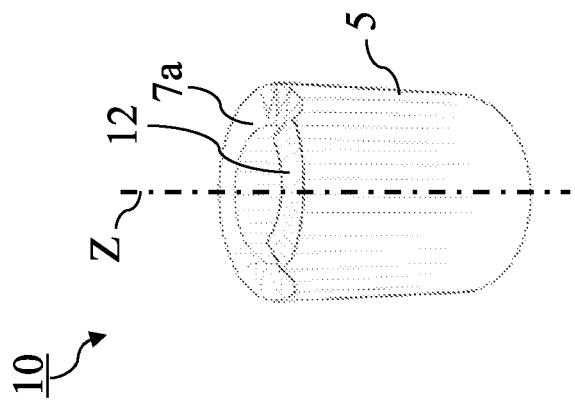
FIG. 6a to FIG. 6c show perspective views of embodiments of pleated filter medium packs wherein the radial outer circumferential surface has a single-fold rotational symmetry.
Figure 6B:
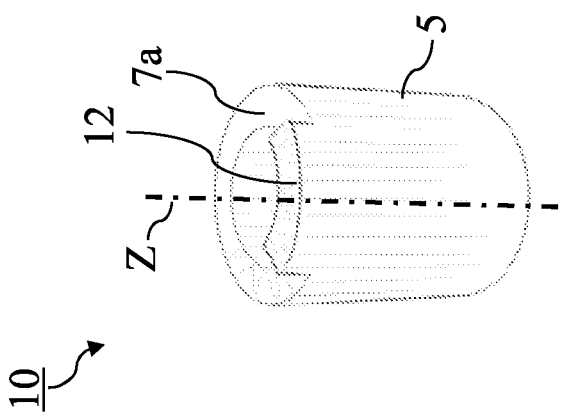
Figure 6A:
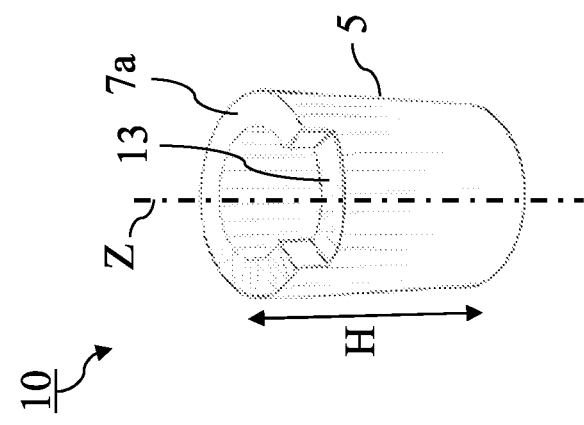
Figure 7B:
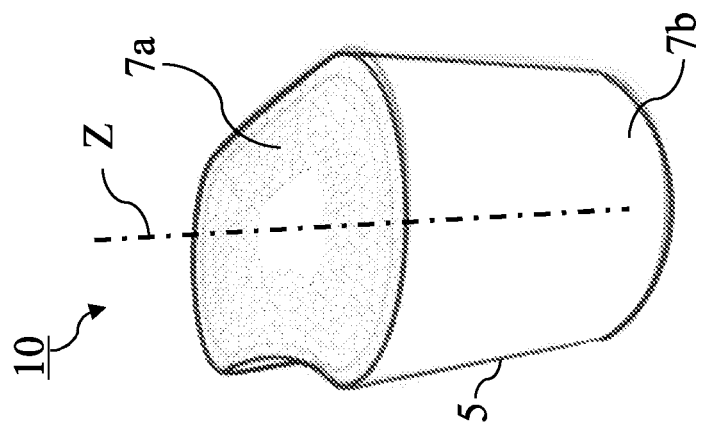
FIG. 7a and FIG. 7b show perspective views of embodiments of filter medium packs wherein the radial outer circumferential surface has a single-fold rotational symmetry.
Figure 7A:
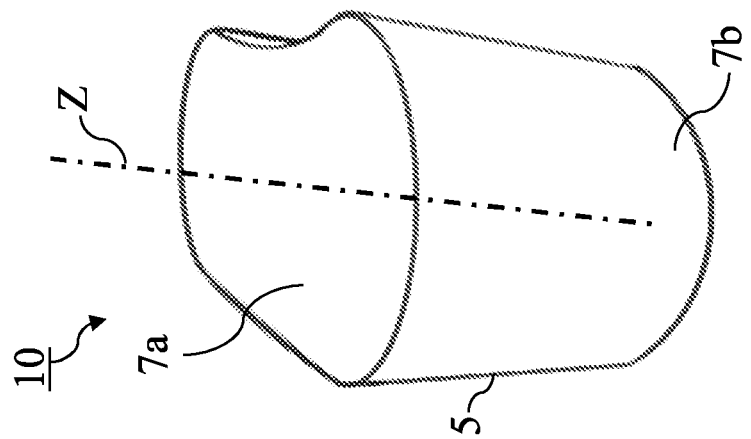

In FIG. 6a to FIG. 6c and in FIG. 7a and FIG. 7b, embodiments of filter medium packs 10 are shown wherein the contour shape of the outer circumferential face 5 of the filter medium pack has a single-fold rotational symmetry. Indeed, when rotating these type of embodiments for example around a central longitudinal axis Z, only by a rotation of 360° the same contour shape is obtained.

In some embodiments, as illustrated on FIG. 6a to FIG. 6c, a single-fold rotational symmetry of the contour shape of the outer circumferential face is obtained by providing one or more battlements 12 or, alternatively, providing one or more notches 13 at an end portion of the filter medium pack. A battlement 12 has to be construed as local end portion of the filter medium pack that locally increases a height of a filter medium pack along the longitudinal direction Z.

In other embodiments, the first and/or second outer axial face of the filter medium pack can be slanted such that the outer circumferential face has a single-fold rotational symmetry. In FIG. 2h, an example of a filter element with filter medium pack having a slanted first axial side is shown and wherein the seal receiver 15 is attached to the slanted first axial side 7a. In FIG. 2g, the seal receiver 15 is colored in black and the white dotted line on the closed-loop surface 16 indicates the central location on the closed-loop surface 16 for receiving a removable circumferential seal member.

In the embodiments shown in FIG. 6a to FIG. 6c, the filter medium packs have a tubular shape. As illustrated in FIG. 6a, a single notch 13 is made in the outer circumferential face 5 of the filter medium pack such that the radial contour of the filter medium pack has a single-fold rotational symmetry. In FIG. 6b and FIG. 6c, embodiments are shown wherein a single battlement 12 is provided to the outer circumferential face of the filter medium pack. In this way, as illustrated on FIG. 6a to FIG. 6c, a first axial face 7a of the filter medium pack is formed that is non-planar.

In embodiments of filter elements, as shown on FIG. 1b, the first axial face 7a is a circumferential non-planar surface having a contour shape corresponding with the contour shape formed by the closed-loop surface 16 of the seal receiver. In these embodiments, both the filter medium pack and the seal receiver have a single-fold rotational symmetry.

In FIG. 7a and FIG. 7b further embodiments are shown of filter medium packs 10 wherein the contour shape of the outer circumferential face 5 has a single-fold rotational symmetry. In these embodiments, the contour shape of the outer circumferential face 5 comprise one concave contour portion such a single-fold rotational symmetry is created.

Figure 8A:
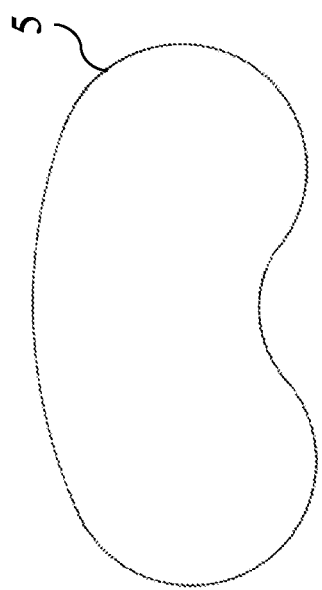
FIG. 8a and FIG. 8b show cross-sections of exemplary filter medium packs with a transverse plane perpendicular to a central longitudinal axis Z, illustrating contour shapes of the outer circumferential face of the filter medium pack having a single-fold rotational symmetry.
Figure 8B:
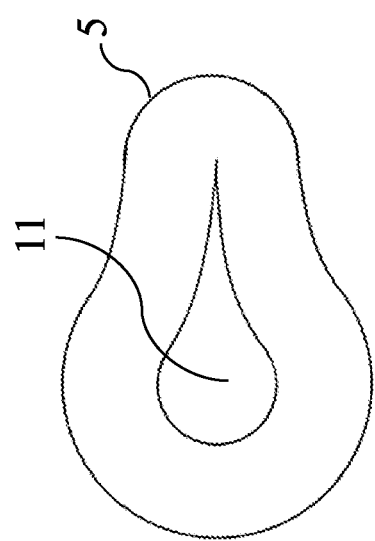

In FIG. 8a and FIG. 8b, a cross-section between a transverse plane and the outer radial circumferential surface 5 of exemplary filter medium pack embodiments are shown, illustrating further examples of contour shapes of the outer circumferential surface 5 having a single-fold rotational symmetry. The transverse plane is a plane located half-way between the first and second outer axial faces, and perpendicular to the median plane defined above.

In the embodiments shown in FIG. 7a and FIG. 7b, the first 7a and second 7b outer axial face of the filter medium pack are planar parallel faces. In other embodiments, the first and/or second outer axial face can be slanted.

In some embodiments, as illustrated on FIG. 2a, wherein the outer circumferential face of the filter medium pack has a single-fold rotational symmetry and wherein the seal receiver 15 is attached to the outer circumferential face 5 of the filter medium pack, the contour shape formed by the closed-loop surface 16 of the seal receiver corresponds to the contour shape of the outer circumferential face 5 of the filter medium pack.

In FIG. 2b, an example of a filter element 1 is shown wherein the filter medium pack 10 has a two-fold rotational symmetry and wherein the closed-loop surface 16 of the seal receiver 15, has a single-fold rotational symmetry.

In embodiments, a contour shape of the outer circumferential face 5 of the filter medium pack 10 is mirror symmetric with respect to a plane of mirror symmetry, preferably the plane of mirror symmetry is crossing the first and second outer axial face of the filter medium pack.

In embodiments wherein the closed-loop surface forms a contour shape having a single plane of mirror symmetry and wherein the single plane of mirror symmetry is crossing the first 7a and second 7b outer axial face of the filter medium pack, the contour shape of the outer circumferential face 5 of the filter medium pack 10 is also mirror symmetric with respect to this single plane of mirror symmetry of the closed-loop surface. An example of such an embodiment is shown on FIG. 2b wherein the plane Z-Y is a mirror plane, for both the filter medium pack and the closed-loop surface of the seal receiver.

Fluted Filter Media

The filter medium packs of the filter elements according to the present disclosure are not limited to particular filter media. The filter medium pack includes for example fluted filter media, pleated filter media or any other filter media suitable for filtering the fluid.

The filter elements 1 shown in FIG. 2a and FIG. 2b are examples of embodiments wherein the filter medium pack includes fluted filter media, also known as Z-filter media. In embodiments, the fluted filter media comprise coiled layers of fluted filter material, and an outer surface of an outer layer of the coiled fluted filter media forms the outer circumferential face 5 of the filter medium pack 10.

Typically, in embodiments of filter medium packs comprising fluted filter media, the first 7a and second 7b outer axial face correspond to respectively a fluid entrance face and a fluid exit face or alternatively correspond to respectively a fluid exit face and a fluid entrance face.

A filter medium pack with coiled Z-filter media is for example disclosed in patent document U.S. Pat. No. 7,396,376. One construction type of Z-filter media, utilizes two specific media components that are joined together to form the media construction. The two components are a fluted, typically corrugated, media sheet and, a facing media sheet. The facing media sheet is typically non-corrugated. The fluted media sheet and the facing media sheet together, are used to define media having a set of parallel inlet flutes and a set of parallel outlet flutes. After securing the fluted sheet together with the facing sheet a layer of fluted filter material is obtained, the fluted filter material comprising the set of inlet and the set of outlet flutes.

Each of the layers of coiled fluted material comprise a set of inlet and a set of outlet flutes. The set of inlet flutes are open at the axial inlet side of the filter body in order to receive the unfiltered fluid and the inlet flutes are closed at the axial outlet side of the filter body. On the other hand, the set of outlet flutes are closed at the axial inlet side and open at the axial outlet side to allow the filtered fluid to exit the filter body. In this way, the fluid is forced to make a Z-shaped trajectory to flow from the axial inlet side to the axial outlet side.

Generally, by coiling the layer of fluted filter material, a filter body is formed having an outer circumferential surface formed by an outer layer of the coiled fluted filter media and having an axial inlet face for receiving unfiltered fluid and an axial outlet face for exiting filtered fluid. In embodiments, the flutes in each of the coiled layers are oriented essentially parallel with a longitudinal direction of the filter medium pack.

In embodiments, during the production process of a rolled fluted filter medium pack, a length of filter medium having a constant width is rolled-up around a winding core. The contour shape of the outer circumferential face of the filter medium pack will depend on the contour shape of the winding core being used. A cylindrical winding core will result in a cylindrical filter medium pack and for example an obround winding core will result in an obround contour shape for the outer circumferential face of the filter medium pack. Generally, after removal of the winding core, the resulting filter medium pack has a hollow center portion 11, as illustrated on FIG. 8b. In some embodiments, the hollow center portion 11 is being filled-up with a material for strengthening the filter medium pack.

A filter medium pack wherein the outer circumferential face has a contour shape with a single-fold rotational symmetry, e.g., resulting from a concave contour portion, can be produced by first producing a cylindrical filter element and thereafter placing the filter medium pack in an appropriate shaped press-mold having protrusions and cavities corresponding to the desired contour shape for the outer circumferential face. Such a press-mold 30 together with a filter medium pack 10 being pressed, is schematically illustrated in FIG. 9.

In patent document WO2017/174199 A1, a further example of filter media comprising channels or flutes is disclosed. The filter media disclosed in this document comprise a group of first channels in which each first channel extends from a first end to a second end and each first channel has at its first end an inlet opening through which the fluid to be filtered can flow into the respective first channel and is closed at its second end, and a group of second channels, in which each second channel extends from a first end to a second end and each second channel has at its second end an outlet opening through which the filtered fluid can flow out of the respective second channel and is closed at its first end. At least one first channel is arranged adjacent to a second channel and the first channel is separated from the second channel by a partition wall, wherein the partition wall is formed of a filter medium through which the fluid to be filtered can flow from the first channel into the second channel.

In further embodiments of filter media similar to the embodiments disclosed in WO2017/174199 A1, the filter media additionally comprise a through-channel that leads through the filter medium pack. The through-channel has an opening at the top face and/or an opening at the bottom face of the filter medium pack. The through-channel can be obtained by simply leaving a certain area of the filter element free from channels that belong to the group of first channels and free from channels that belong to the second group of second channels and free from any other type of channel that has an opening at either the top face or the bottom face, but has no further opening. In embodiments, an element is placed in the through-channel that closes the flow fluid through the through-channel, while leaving a volume open inside the through-channel.

Pleated Filter Media

The filter elements illustrated in FIG. 1a and FIG. 1b are examples of filter elements comprising filter medium packs including pleated filter media. The pleated filter media have a plurality of pleats placed in a closed loop, for example an annulus. In this way, a hollow filter body is formed extending in a longitudinal direction Z. The hollow filter body has a first opening and a second opening at respectively a first end and a second end of the hollow filter body. The pleats are for example formed by folding a sheet of filter paper. In the embodiment shown on FIG. 1b, the hollow filter body is a hollow-shaped cylinder with a battlement 12 at the first end, whereas the embodiment shown in FIG. 1b illustrates a filter element with a cylindrically-shaped filter medium pack having planar axial sides.

A plurality of outer tips of the plurality of pleats form an outer circumferential perimeter of the hollow filter body. In this embodiment, the outer circumferential face 5 of the filter medium pack 10 corresponds to this circumferential perimeter formed by the outer tips of the pleats, and the first 7a and second 7b axial face of the filter medium pack corresponds to respectively the first and the second end of the hollow filter body. In embodiments, typically the folding lines of the pleated filter media are oriented essentially parallel with the longitudinal axis Z.

After installing the filter element shown on FIG. 1a or FIG. 1b in a housing of a filter system, and when the filter system is in operation, the fluid is crossing the filter media in a direction transverse to the longitudinal direction Z. For example, fluid to be filtered traverses through the circumferential face 5 of the filter medium pack towards the interior of the hollow filter body formed by the pleated media and filtered fluid exits the filter medium pack through a central opening in the first axial face 7a of the filter medium pack. This central opening in the first axial face 7a corresponds to the opening at the first end of the hollow filter body. Hence, these type of embodiments require an open end cap and a closed end cap at respectively the first and second end of the hollow filter body formed by the pleated filter media.

In embodiments, as illustrated on FIG. 1b, the first axial face 7a comprises a circumferential non-planar surface. As discussed above, in embodiments, the non-planar surface is obtained by providing the outer circumferential face with one or more battlements at the first end of the filter medium pack. In the example shown on FIG. 1b, one battlement 12 is provided. During the manufacturing process of the filter element, the seal receiver 15 is sealingly attached to the non-planar surface of the filter medium pack. Hence, in this embodiment, the seal receiver is also forming the open end cap for the first axial side 7a of the filter medium pack.

In embodiments, as shown on FIG. 1b, the circumferential non-planar surface of the first axial face 7a has a shape corresponding with the shape of the closed-loop surface 16 of the seal receiver 15. In this embodiment, the closed-loop surface is a smooth surface essentially parallel with the circumferential non-planar surface of the first axial face 7a.

In the embodiments shown in FIG. 1a and FIG. 1b, the closed-loop surface 16 of the seal receiver is an axial-facing surface with respect to the longitudinal axis Z.

In embodiments of a filter element wherein the filter media are pleated filter media, the filter medium pack 10, as illustrated on FIG. 1a and FIG. 1b has a hollow shape and the seal receiver 15 forms an open end cap for the filter medium pack for receiving unfiltered fluid or for evacuating filtered fluid. Preferably, in these embodiments, a closed end cap is sealingly attached to the second outer axial face 7b of the filter medium pack.

Filter Assembly

According to a further aspect of the present disclosure, a filter assembly 100 is provided comprising essentially to major separable components, namely a filter element 1 as discussed above and a seal carrier 50. Multiple examples of embodiments of filter assemblies 100 according to the present disclosure are shown in FIG. 10a to FIG. 17.

The seal carrier 50 forms a removable interface between the filter element 1 and a housing of a filter system. The seal carrier 50 comprises a first circumferential seal member 51 and a second circumferential seal member 52. The seal carrier further comprises a seal supporting structure 53 configured for supporting the first and second circumferential seal members.

When the filter element is inserted in the housing of the filter system, the first circumferential seal member 51 forms a seal between the filter element 1 and the seal carrier 50 and the second circumferential seal member 52 forms a seal between the seal carrier 50 and the housing of the filter system. The contour shape of the first circumferential seal member 51 is configured for matching with the contour shape of the closed-loop surface 16 of the seal receiver 15 of the filter element such that a tight and reliable seal can be formed.

In embodiments, the seal supporting structure 53 of the seal carrier 50 has a first circumferential support portion configured for supporting the first circumferential seal member 51 and a second circumferential support portion configured for supporting the second circumferential seal member 52.

In embodiments, the seal supporting structure 53 is formed by a frame member. In other elements, the seal supporting structure 53 is formed by a shell member that is configured for partly or entirely surrounding the outer circumferential face 5 of the filter medium pack 10. In these embodiments, the first and second circumferential seal are attached to the outer wall of the shell member. A seal carrier wherein the seal supporting structure 53 for supporting the circumferential seals is a shell member is illustrated in FIG. 14 and FIG. 15.

In embodiments, the first and second circumferential seal are attached to the seal supporting structure of the seal carrier. The seals can be attached to the seal supporting structure by a glue or by any other suitable means. In other embodiments, the first and second circumferential seal are removably attached to the seal supporting structure such that the first and second circumferential seal can be replaced while continuing using the same seal supporting structure.

In embodiments, the seal supporting structure 53 of the seal carrier together with the first 51 and the second 52 circumferential seal member are manufactured by applying a multi-component injection moulding manufacturing process. A first component of the multi-component injection moulding process is used for forming the seal supporting structure 53 of the seal carrier and a second component is used to form the first 51 and second 52 circumferential seal member. In this way, the first and second circumferential seal member are attached to respectively the first and second circumferential support portion of the seal supporting structure 53 during the injection moulding manufacturing process and hence the seal supporting structure 53 together with the first 51 and second 52 circumferential seal member form a single part. For example two different types of polymers can be used as the two components when applying a two-component injection moulding manufacturing process, e.g., a relatively hard material, such as a hard plastic, for the seal supporting structure 53 and a relatively softer material, such as a rubber material, for the first 51 and second 52 circumferential seal member. In one aspect, the material(s) used for the first and second seal members 51, 52 can be characterized as being relatively softer, more compressible, and/or more deflectable in relation to the material used to form the seal supporting structure 53. Similarly, the material(s) used for the first and second seal members 51, 52 can be characterized as being relatively softer, more compressible, and/or more deflectable in relation to the material used to form the closed-loop surface 16. In some examples, the material(s) used to form the first and second seal members 51, 52 can also be characterized as having a higher coefficient of friction in comparison to the material(s) used to form the seal supporting structure 53 and/or the closed-loop surface 16.

In the embodiment shown on FIG. 12a, the filter medium pack 10 comprises fluted filter media and the filter element 1 comprises an anti-telescopic element 60 coupled to the second axial face of the filter medium pack. The anti-telescopic element avoids the coiled layers from moving in the longitudinal direction Z. This moving in the longitudinal direction is generally known as telescoping and results for example from the pressure difference between the inlet and outlet of the filter element or results as a consequence of vibrations. The coupling of the anti-telescopic element 60 with the second axial face of the filter medium pack is for example obtained by gluing or by thermal welding as part of the manufacturing process of the filter element 1. In FIG. 12a, the seal receiver 15 attached to the filter medium pack 10 is colored in black, and the white dotted line on the seal receiver indicates the location where the first circumferential 51 is to be received when the seal carrier 50 is coupled to the filter element.

In FIG. 13, a perspective view of a further example of a filter assembly 100 according to the present disclosure is shown. For illustrative purposes, only half of the filter element is shown. This embodiment illustrates that the contour shape of the first 51 and second 52 circumferential seal member are not necessary the same. In this embodiment the outer circumferential face 5 of the filter medium pack filter has a concave contour portion, similar to the filter medium pack shown in FIG. 7a. The seal receiver 15 has a belt-shape and the contour shape formed by the closed-loop surface 16 of the seal receiver corresponds to the contour shape of the outer circumferential face 5 of the filter medium pack. As mentioned above, the contour shape of the first circumferential seal member is configured for matching with the contour shape of the closed-loop surface of the seal receiver 15. In the embodiment shown on FIG. 13, the second circumferential seal member 52, supported by the second support portion of the seal supporting structure 53 of the seal carrier 50, has a contour shape that is different from the contour shape of the first circumferential seal member 51 and the contour shape of the second circumferential seal member 52 can, as in this example, have a two-fold rotational symmetry, whereas the contour shape of the first circumferential seal member 51 has a single-fold rotational symmetry.

In preferred embodiments, the filter assembly 100 comprises a snap-fit connector 20, and wherein the seal receiver 15 of the filter element and the seal carrier 50 are configured for engaging with the snap-fit connector 20 so as to make a removable connection between the seal receiver 15 and the seal carrier 50. As discussed above, the snap-fit connector 20 has to be construed as a cantilever arm for snap-fitting and bridging a distance between the seal receiver and the seal carrier. In this way, when the filter element is to be installed in a housing of a filter system, by using the snap-fit connection, the seal carrier 50 is first attached to the seal receiver 15 such that the filter element 1 and the seal carrier 50 form a connected unit, facilitating the installation of the filter element in the housing. In embodiments the filter assembly 100 comprises multiple snap-fit connectors 20.

In FIG. 11a, an embodiment of a filter assembly 100 is shown wherein the seal receiver 15 comprises a snap-fit connector 20 configured for making a snap-fit connection between the seal receiver 15 and the seal carrier 50. The snap-fit connector 20 can for example, as schematically shown on FIG. 4j, be part of the seal receiver 15 and for example be rotatably or be pliantly attached to a portion of the seal receiver 15. In the embodiment shown on FIG. 11a, the seal carrier 50 comprises a snap-fit engaging element 21, e.g., a groove or a cut-out, configured such that an end portion of the snap-fit connector 20, e.g., a hook or a stud, can click into the snap-fit engaging element 21 so as to make an interconnection between the seal receiver 15 and the seal carrier 50. FIG. 11b illustrates a the filter assembly 100 after snap-fitting the seal receiver 15 with the seal carrier 50 using the snap-fit connector 20.

In embodiments, as shown in FIG. 4b, FIG. 4h and FIG. 4j the seal receiver comprises an engaging element 21 configured for receiving a snap-fit connector 20 which can for example be rotatably or be pliantly attached to the seal carrier. In other embodiments, as illustrated on FIG. 16, the engaging element 21 of the seal receiver 15 is configured for receiving a latch 25 of the seal carrier 50.

In further embodiments of filter assemblies 100, both the seal receiver 15 and the seal carrier 50 comprise an engaging element 21 configured for receiving a snap-fit connector 20. In these embodiments, the snap-fit connector is a separate element wherein a first end portion interlocks with the snap-fit engaging element 21 of the seal receiver and a second end portion of the snap-fit connector 20, opposite the first end portion, interlocks with the snap-fit engaging element 21 of the seal carrier.

In FIG. 17 a further example of an embodiment of a filter assembly 100 is shown wherein the filter assembly comprises a clamp 26 for clamping the seal carrier 50 to the filter element.

In FIG. 14 and FIG. 15, a further example of an embodiment of a filter assembly 100 is shown. In this embodiment, the seal supporting structure 53 of the seal carrier 50 supporting the first 51 and second 52 circumferential seal is formed by a shell member. In this embodiment, the filter element, comprising the filter medium pack 10 and the seal receiver, is insertable in the shell such that after insertion, the shell is surrounding or at least partly surrounding the outer circumferential face 5 of the filter medium pack 10. The shell member forms a robust protection for the filter medium pack. The two vertical arrows on FIG. 14 indicate a direction for inserting the filter element in the shell member 53 of the seal carrier 50.

In embodiments, the closed-loop surface 16 of the seal receiver 15 is configured for receiving a removable circumferential lip seal. For example, as illustrated on FIG. 14 and FIG. 15, the first circumferential seal member 51 is a circumferential lip seal configured for engaging with the closed-loop surface of the seal receiver 15. In embodiments, the second circumferential seam member 52 is also a lip seal.

Filter System

According to an additional aspect of the present disclosure, embodiments of filter systems are provided comprising a filter assembly 100 as defined above and a filter housing. In these embodiments, the seal carrier 50 of the filter assembly 100 forms a removable interface between the filter element 1 and the filter housing of the filter system.

In other embodiments, the filter system does not comprise a seal carrier 50 forming a removable interface between the filter element 1 and the filter housing. In those embodiments without such a seal carrier, the filter system comprises a filter element as defined above, a filter housing configured for receiving the filter element and a circumferential seal member coupled to a wall portion of the filter housing. In these embodiments without seal carrier 50, the circumferential seal member coupled to the wall portion of the filter housing forms a seal between the filter element and the filter housing. The contour shape of the circumferential seal member is further configured for matching with the contour shape of the closed-loop surface 16 of the seal receiver of the filter element. In this way, when inserting the filter element in the filter housing, the circumferential seal member coupled to the filter housing is being received by the closed-loop surface of the seal receiver.

Advantageously, for embodiments wherein the contour shape of the closed-loop surface, and hence also a contour shape of circumferential seal, has a single-fold rotational symmetry, when replacing the filter element, the circumferential seal is maintained in the same position with respect to the housing.

Similarly, for embodiments wherein the closed-loop surface forms a contour shape having a single plane of mirror symmetry that is crossing the first 7a and second 7b outer axial face, there is also a contour shape of the circumferential seal that is mirror symmetric with respect to the single plane of mirror symmetry. Also for these embodiments, when replacing the seal, the circumferential seal is maintained in the same position with respect to the housing.

In embodiments of filter systems without seal carrier, the circumferential seal member is permanently attached to the wall portion of the filter housing. In other embodiments of filter systems without seal carrier, the circumferential seal member is removeably coupled to the wall portion of the housing, and hence the circumferential seal member can be replaced.

| Reference numbers | |
|---|---|
| 1 | filter element |
| 5 | outer circumferential face of the filter medium pack |
| 7a | first outer axial face of the filter medium pack |
| 7b | second outer axial face of the filter medium pack |
| 10 | filter medium pack |
| 11 | hollow center portion |
| 12 | battlement |
| 13 | notch |
| 15 | seal receiver |
| 16 | closed-loop surface |
| 17 | glue |
| 19 | shrink-wrap |
| 20 | snap-fit connector |
| 21 | engaging element |
| 25 | latch |
| 26 | clamp |
| 30 | press-mold |
| 50 | seal carrier |
| 51 | first circumferential seal member |
| 52 | second circumferential seal member |
| 53 | seal supporting structure |
| 60 | anti-telescopic element |
| 100 | filter assembly |
| Z | central longitudinal axis |

The invention claimed is:

1. A filter element for insertion into a housing of a filter system, comprising:
 a filter medium pack including pleated filter media for filtering a fluid, having an outer circumferential face extending between a first outer axial face and a second outer axial face opposite the first outer axial face;
 a seal receiver sealingly attached to the filter medium pack, wherein the seal receiver comprises a closed-loop surface for receiving a removable circumferential seal member,
 wherein said closed-loop surface forms a contour shape with single-fold rotational symmetry, and wherein the seal receiver is sealingly attached to the first outer axial face of the filter medium pack.

2. The filter element of claim 1, wherein said contour shape of the closed-loop surface is mirror symmetric with respect to a mirror plane crossing said first and second outer axial face.

3. The filter element of claim 1, wherein said seal receiver (15) comprises a material having a hardness either measured on a shore-A scale between 60 and 100.

4. The filter element of claim 1, wherein said closed-loop surface is a non-planar surface.

5. The filter element of claim 1, wherein said closed-loop surface of the seal receiver is any of the following: a radially inward-facing surface; a radially outward-facing surface; or an axially-facing surface with respect to a central longitudinal axis extending from the first to the second outer axial face.

6. The filter element of claim 1, wherein said seal receiver comprises an engaging element for engaging with a snap-fit connector or for engaging with a latch, or alternatively wherein said seal receiver comprises a snap-fit connector or a latch.

7. A filter element for insertion into a housing of a filter system, comprising:
 a filter medium pack including pleated filter media for filtering a fluid, having an outer circumferential face extending between a first outer axial face and a second outer axial face opposite the first outer axial face;
 a seal receiver sealingly attached to the filter medium pack, wherein the seal receiver comprises a closed-loop surface for receiving a removable circumferential seal member,
 wherein said closed-loop surface forms a contour shape with single-fold rotational symmetry;
 wherein said first outer axial face is formed by a circumferential non-planar surface having a contour shape corresponding with the contour shape formed by the closed-loop surface of the seal receiver.

8. The filter element of claim 7, wherein the filter element does not comprise a seal member.

9. The filter element of claim 7, wherein the seal receiver comprises a single closed-loop surface configured for receiving a single removable circumferential seal member.

10. The filter element of claim 7, wherein said filter medium pack has a hollow shape and wherein the seal receiver forms an open end cap for the filter medium pack for receiving unfiltered fluid or for evacuating filtered fluid, preferably a closed end cap is sealingly attached to the second outer axial face of the filter medium pack.

11. The filter element of claim 7, wherein the filter medium pack has a hollow shape and wherein at an end of the filter medium pack, the outer circumferential face comprises one or more battlements or alternatively one or more notches configured for forming said circumferential non-planar surface of the first outer axial face.

12. A filter element for insertion into a housing of a filter system, comprising:
 a) a media pack for filtering a fluid, the media pack defining an outer circumferential face extending between a first axial face and a second axial face; and
 b) a seal receiver sealingly attached to the media pack, the seal receiver including:
  i) a closed-loop surface for receiving a separately formed circumferential seal member, wherein the closed-loop surface forms a contour shape with single-fold rotational symmetry; and ii) an engaging element for removably securing the circumferential seal member to the seal receiver;

c) wherein the seal receiver is sealingly attached to the first axial face of the media pack, wherein said first axial face is formed by a circumferential non-planar surface having a contour shape corresponding with the contour shape formed by the closed-loop surface of the seal receiver.

13. The filter element of claim 12, wherein the contour shape of the closed-loop surface is mirror symmetric with respect to a mirror plane crossing said first and second axial face.

14. The filter element of claim 12, wherein the seal receiver comprises a material having a hardness either measured on a shore-A scale between 60 and 100.

15. The filter element of claim 12, wherein the closed-loop surface is a non-planar surface.

16. The filter element of claim 12, wherein the engagement element is one of a first component of a snap-fit connection and an extension member configured to receive a latch member.

17. The filter element of claim 12, wherein the media pack comprises fluted filter media.

18. The filter element of claim 12, wherein said media pack comprises pleated filter media.

19. The filter element of claim 18, wherein the media pack has a hollow shape and wherein at an end of the media pack, the outer circumferential face comprises one or more battlements or alternatively one or more notches configured for forming said circumferential non-planar surface of the first axial face.

20. The filter element of claim 18, wherein said media pack has a hollow shape and wherein the seal receiver forms an open end cap for the media pack for receiving unfiltered fluid or for evacuating filtered fluid, preferably a closed end cap is sealingly attached to the second axial face of the media pack.

* * * * *